Oct. 18, 1960    B. A. STROUT    2,956,284
FASTENER INSERTING MACHINES
Filed Aug. 5, 1958    13 Sheets-Sheet 1

Inventor
Basil A. Strout
By his Attorney

Oct. 18, 1960        B. A. STROUT        2,956,284
FASTENER INSERTING MACHINES
Filed Aug. 5, 1958        13 Sheets-Sheet 2

Oct. 18, 1960   B. A. STROUT   2,956,284
FASTENER INSERTING MACHINES
Filed Aug. 5, 1958   13 Sheets-Sheet 3
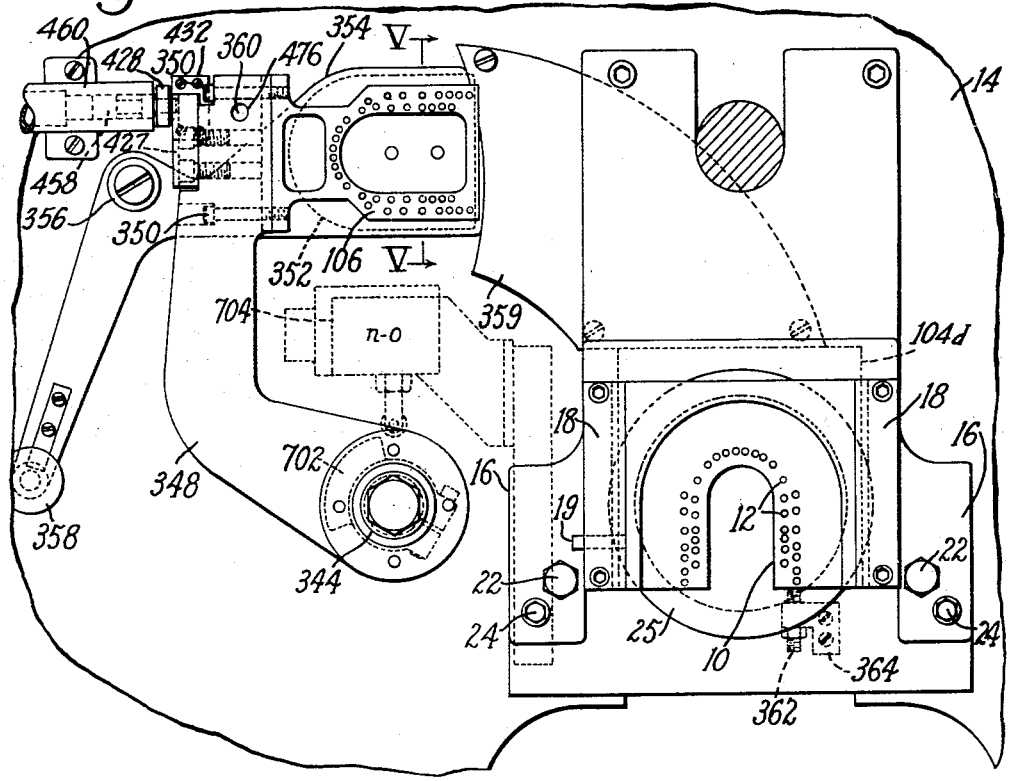
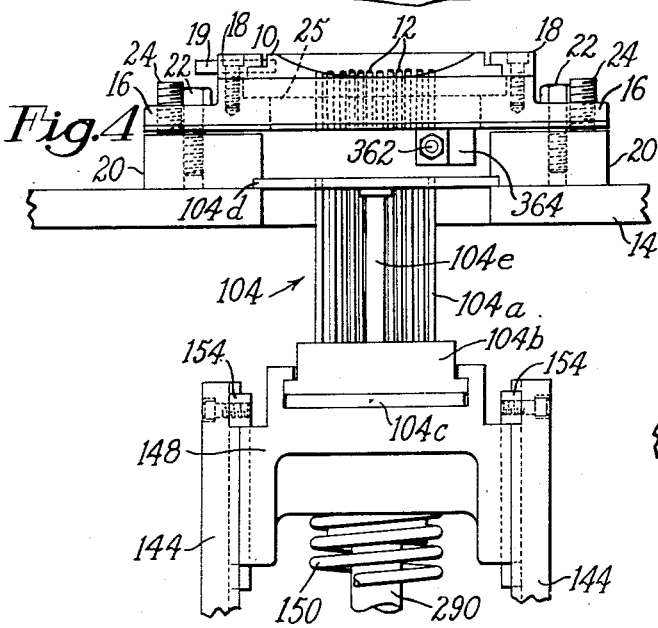
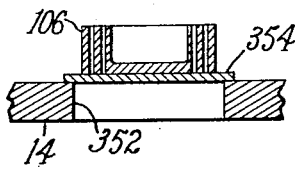

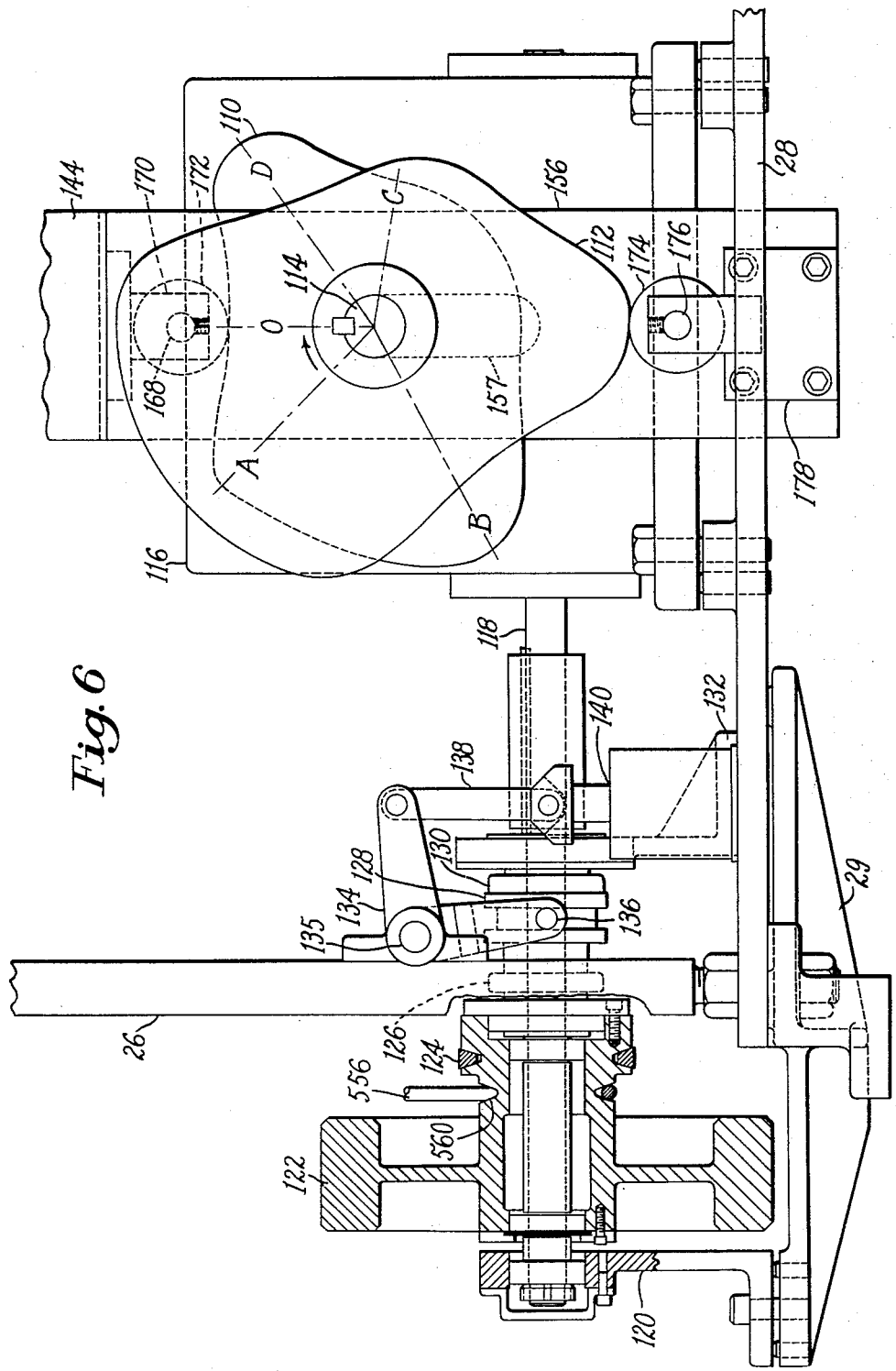

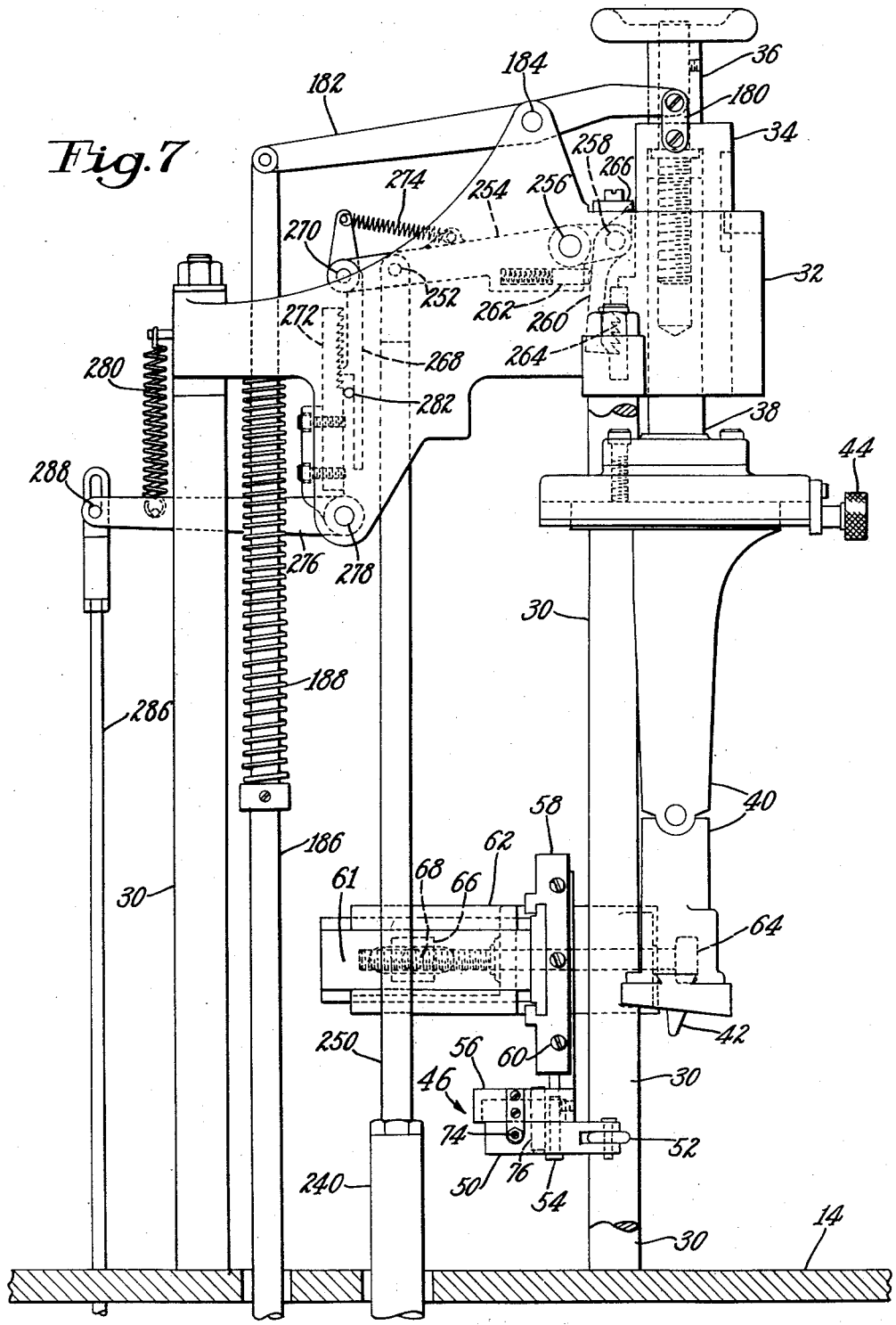

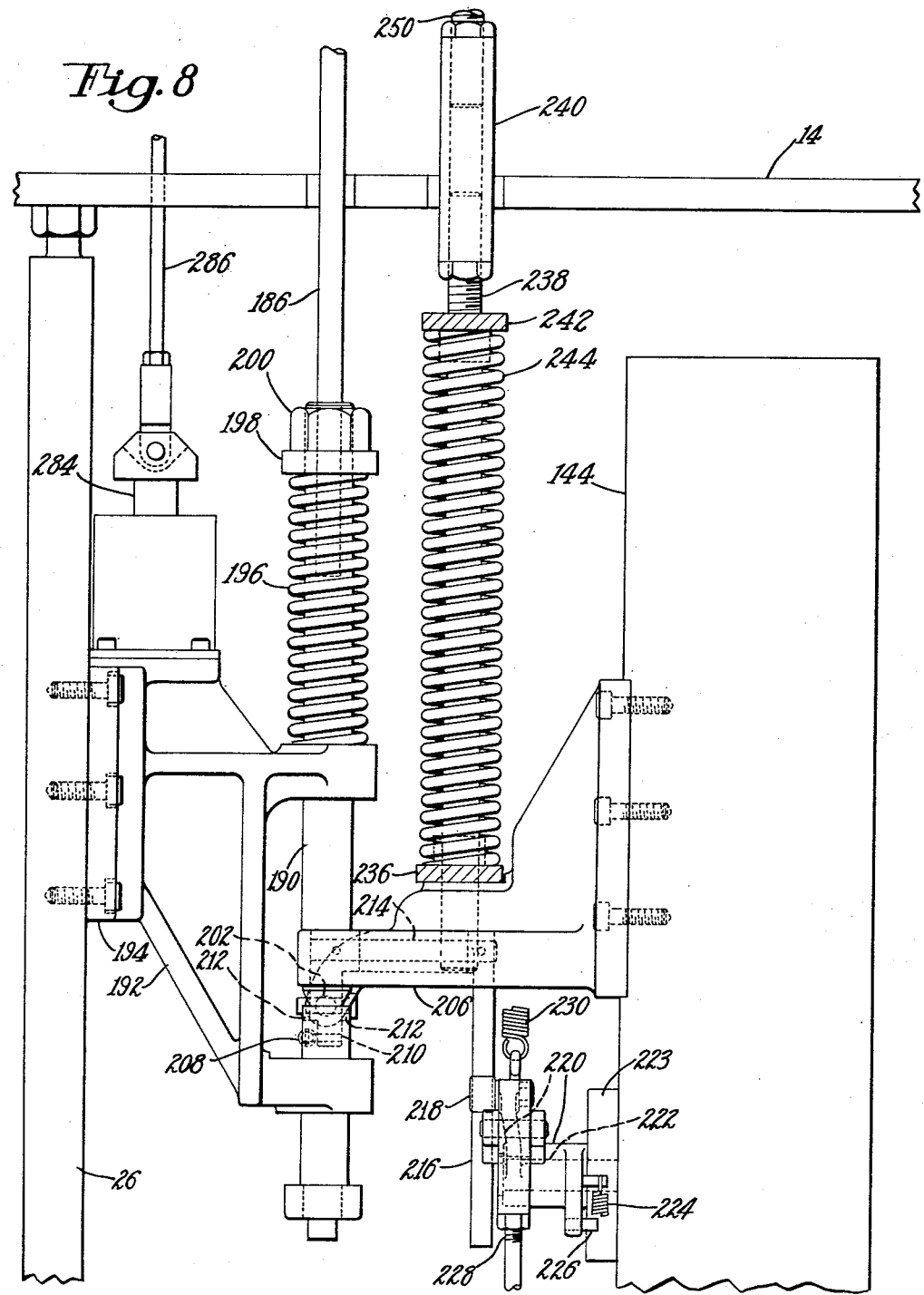

Oct. 18, 1960 B. A. STROUT 2,956,284
FASTENER INSERTING MACHINES
Filed Aug. 5, 1958 13 Sheets-Sheet 7
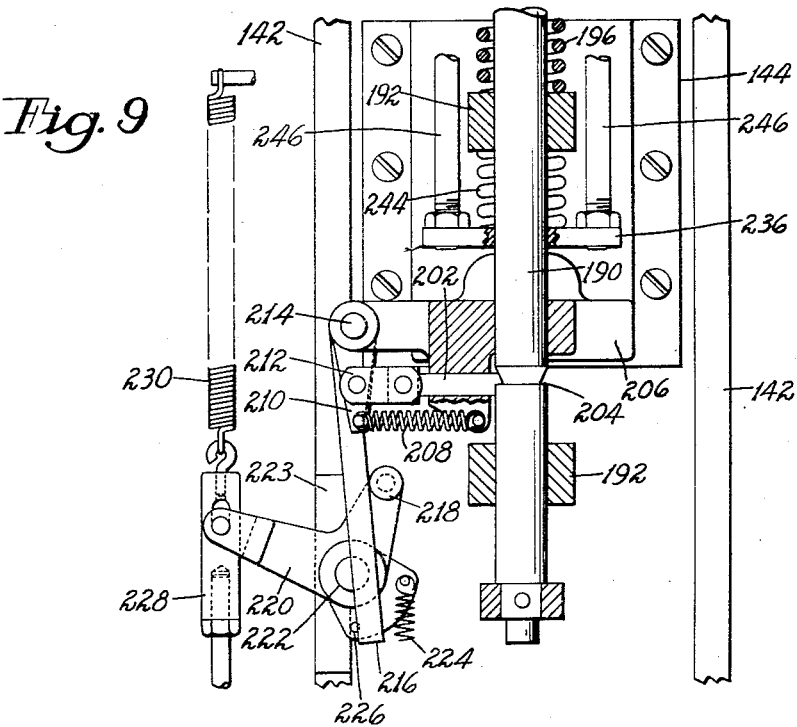
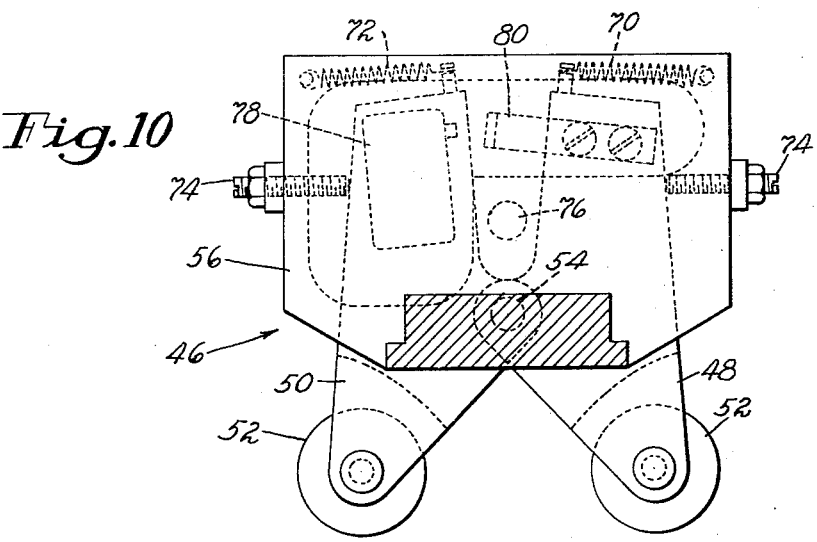

Oct. 18, 1960
B. A. STROUT
2,956,284
FASTENER INSERTING MACHINES
Filed Aug. 5, 1958
13 Sheets-Sheet 8
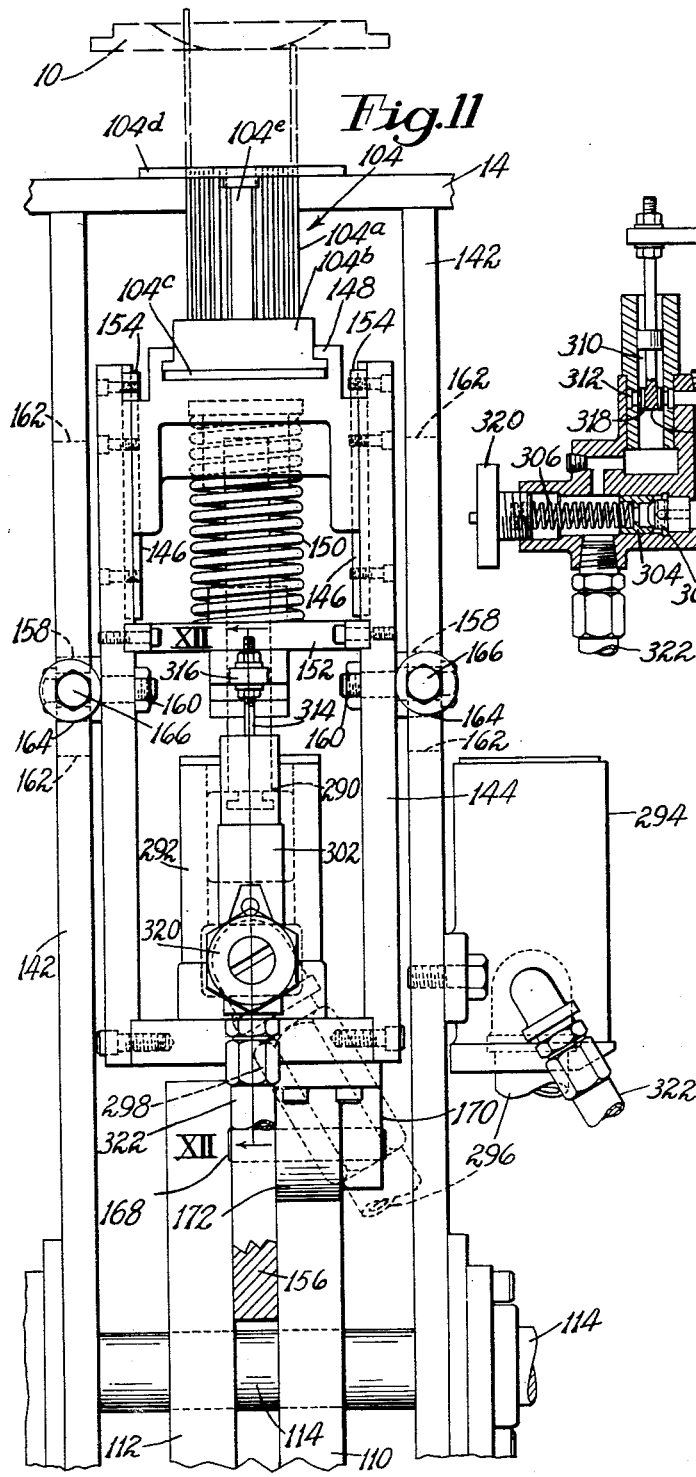
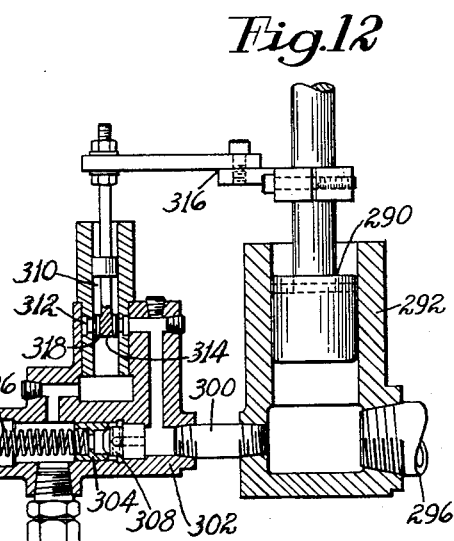

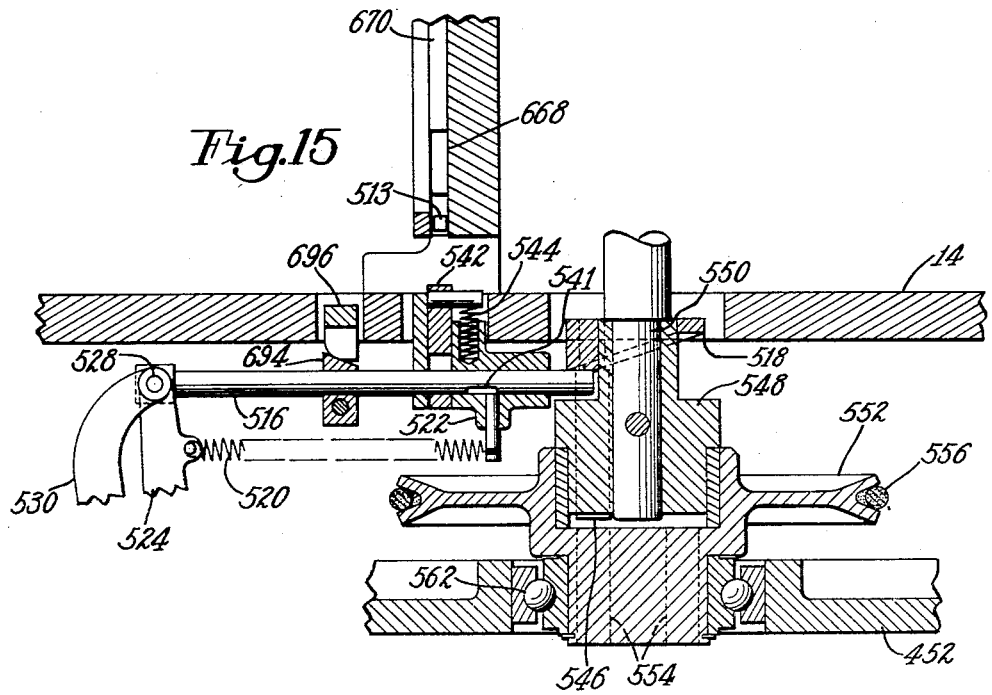
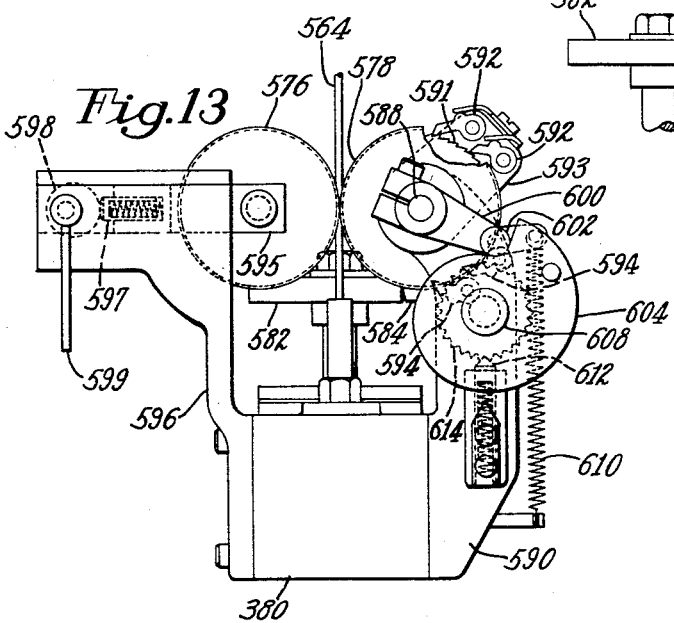

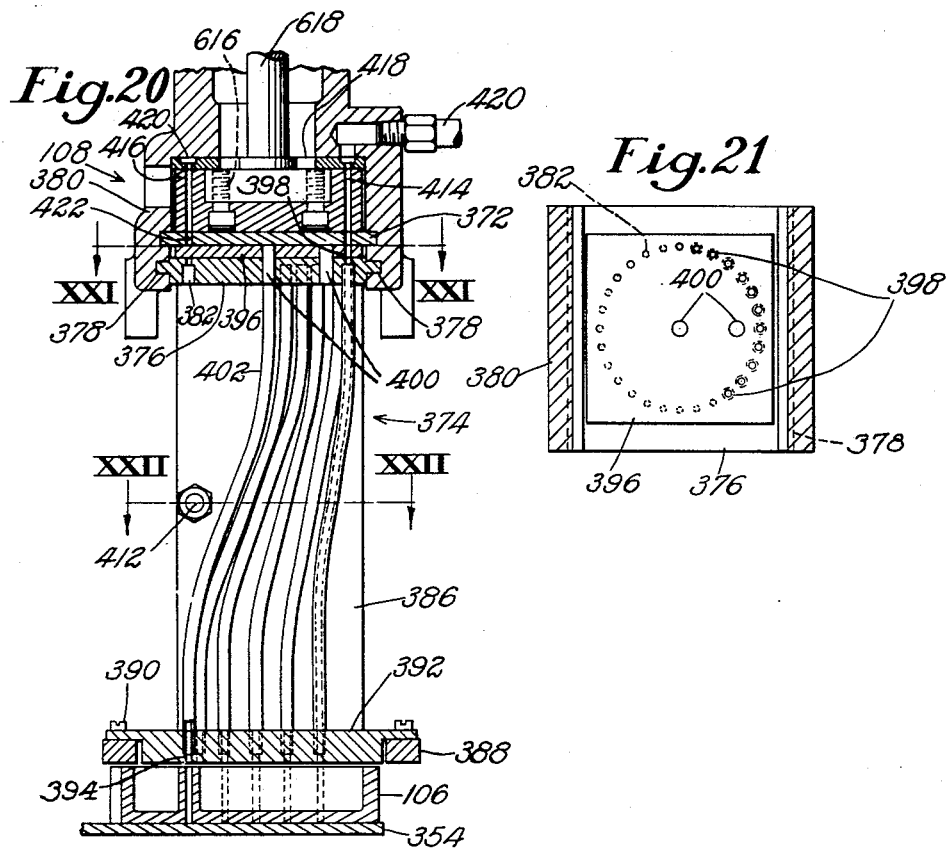
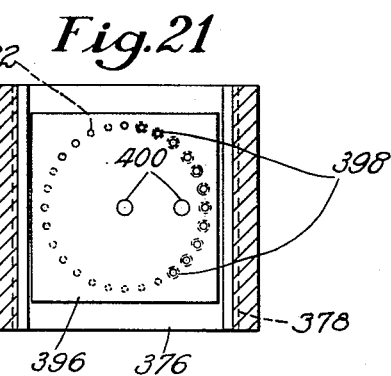
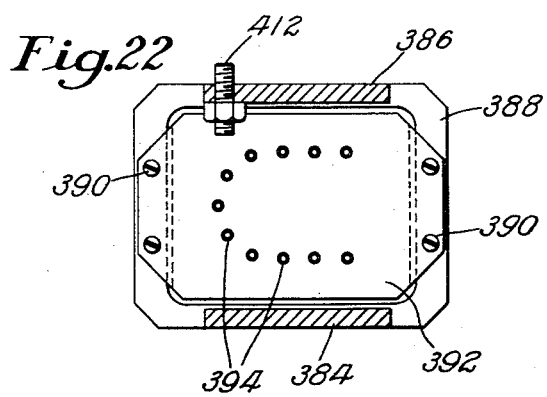

United States Patent Office 2,956,284
Patented Oct. 18, 1960

2,956,284

FASTENER INSERTING MACHINES

Basil A. Strout, Saugus, Mass., assignor to United Shoe Machinery Corporation, Boston, Mass., a corporation of New Jersey Filed Aug. 5, 1958, Ser. No. 753,297

15 Claims. (Cl. 1—301)

This invention relates to fastener inserting machines and is illustrated herein as embodied in a machine for performing a heel seat fastening operation upon a lasted shoe.

In the usual performance of this kind of operation, various layers of shoe parts, which may include an outsole, an upper, a lining, a counter, and an insole, are fastened together by nails which are clenched against the bottom plate on the last. However, with a view to avoiding the use of metallic fasteners, the illustrative machine has been designed to employ fiber fasteners, which are not susceptible to being clenched, and for this reason must be driven fully into the innermost shoe part in order to be effective. When such fasteners are used, it is necessary to prick holes in the work to the depth to which the fasteners are to penetrate.

As the aggregate thickness of the shoe parts to be fastened may vary considerably, because of variation in the thickness of the individual parts as well as the number of parts, it is evident that different work pieces require pricking to depths of considerable range.

The heel seat of a shoe to be operated upon in the illustrated machine is held firmly against a work support through which drivers are operated in successive pricking and driving strokes to prick the work and to drive fasteners therein. The drivers are brought substantially flush with the work engaging surface of the work support, at the end of each driving stroke, to set the exposed ends of the fasteners substantially flush with the outer surface of the work. Hence, the driving stroke is constant, regardless of the thickness of the shoe parts to be fastened. However, the height of the last bottom above the work support will vary with the compression and thickness of the shoe parts. It is evident, therefore, that the drivers must be operated through a pricking stroke of variable length and of greater length than the driving stroke.

In view of the foregoing, it is an object of the invention to provide an improved driver mechanism which will automatically prick the work, regardless of its thickness, to the full depth without risk of mutilating either the drivers or the last bottom. To this end, and in accordance with a feature of the invention, the driving mechanism of the illustrated machine comprises, with a driver unit and a driving element therefor which is operable through a pricking stroke longer than is necessary for the thickest work, yieldable force transmitting means disposed between the driver unit and the driving element for first permitting relative yielding movement between the unit and element, in response to pressure exceeding that required for the full penetration of the work by the drivers and then, abruptly relieving the pressure applied to the drivers.

Preferably, and as herein illustrated, the above-mentioned yieldable force transmitting means comprise a fluid pressure system out of which fluid is vented, in one stage, in response to a predetermined fluid pressure which is developed as the ends of the drivers complete their penetration of the work and, in a second stage, abruptly to relieve the fluid pressure in response to movement of the driving element, permitted by the first venting action, after the driver unit has stopped. Thus, it is insured that the drivers will penetrate the work to the last bottom, because the first venting action does not take place until the necessary pressure has been developed in the fluid system, and insurance against damage to the drivers or to the last is provided by the prompt and effective reduction of the pressure of the drivers against the last by the second venting action.

Upon the initiation of a cycle of operation of the illustrated machine, a holddown is operated to clamp the work piece upon the work support; the driver mechanism is operated to prick the work and then to drive fasteners therein; a loader arm, already filled with fasteners, is brought beneath the work support at the operating station between the pricking and driving operations; and, upon the return of the loader arm to its initial position, it is replenished with fasteners for the succeeding operation and a fastener forming device is actuated to form, from a continuous length of fastener material, another supply of fasteners in the required number.

Shoes of different sizes require fastener patterns differing from each other in respect to the number or arrangement of fasteners. Accordingly, the machine is fitted with certain interchangeable parts for accommodating different fastener patterns and is provided with a counting mechanism, associated with the above-mentioned fastener forming device, for insuring the production of the proper number of fasteners in each cycle of its operation.

Among such interchangeable parts, in the illustrated machine, is a distributor for delivering fasteners to the loader arm, this distributor being characterized, in accordance with a further feature of the invention, by the fact that it has a stop thereon in a position related to the distributor's fastener capacity, the stop being arranged to co-operate with the above-mentioned counting mechanism so as to cause the exact number of fasteners required by the distributor to be made by the fastener forming device.

Invention is also to be recognized in the illustrated holddown structure which holds the work against the work support with first a preliminary pressure and then a final pressure, the holddown structure being energized and operated by the above-mentioned driver mechanism.

The above and other features of the invention will appear more fully from the following detailed description, when read in connection with the accompanying drawings, and will be pointed out in the claims.

In the drawings,

Fig. 3 is a plan view including work supporting structure at the operating station and mechanism for delivering fasteners to the operating station;

Fig. 4 is a front elevation of structure at the operating station, including the work supporting structure of Fig. 3, and the upper portion of the driver mechanism;

Fig. 5 is a sectional elevation of the loader arm and related structure shown in Fig. 3, the section being taken along the line V—V;

Fig. 6 is a side elevation, partly in section, showing driving mechanism illustrated in Fig. 2, but at a larger scale;

Fig. 7 is a side elevation of holddown structure viewed from the left, as in Fig. 2, but at a larger scale;

Fig. 8 is a side elevation, as viewed from the left, of operating structure for the holddown device which is immediately below the structure of Fig. 7;

Fig. 9 is a sectional rear elevation of the lower portion of the structure shown in Fig. 8;

Fig. 10 is a plan view of structure for centering the heel end of a shoe with respect to the work support and driver;

Fig. 11 is a front elevation of the driver mechanism;

Fig. 12 is a sectional elevation, the section being taken along the line XII—XII in Fig. 11, of a portion of the driver mechanism as viewed from the right;

Fig. 13 is a front elevation of means, associated with the fastener forming device, for feeding fastener material thereto;

Fig. 14 is a sectional front elevation of a portion of the structure shown in Fig. 13;

Fig. 15 is a sectional front elevation of driving means for the fastener forming device, the section being taken along the line XV—XV in Fig. 2;

Fig. 20 is a sectional front elevation of the lower portion of the fastener forming device and the distributor for delivering fasteners from the fastener forming device to the loader arm, the section being taken along the line XX—XX of Fig. 16;

Fig. 21 is a sectional plan view of structure illustrated in Fig. 20, the section being taken along the line XXI—XXI; and Fig. 22 is a sectional plan view of the distributor, the section being taken along the line XXII—XXII in Fig. 20.

Figure 1:
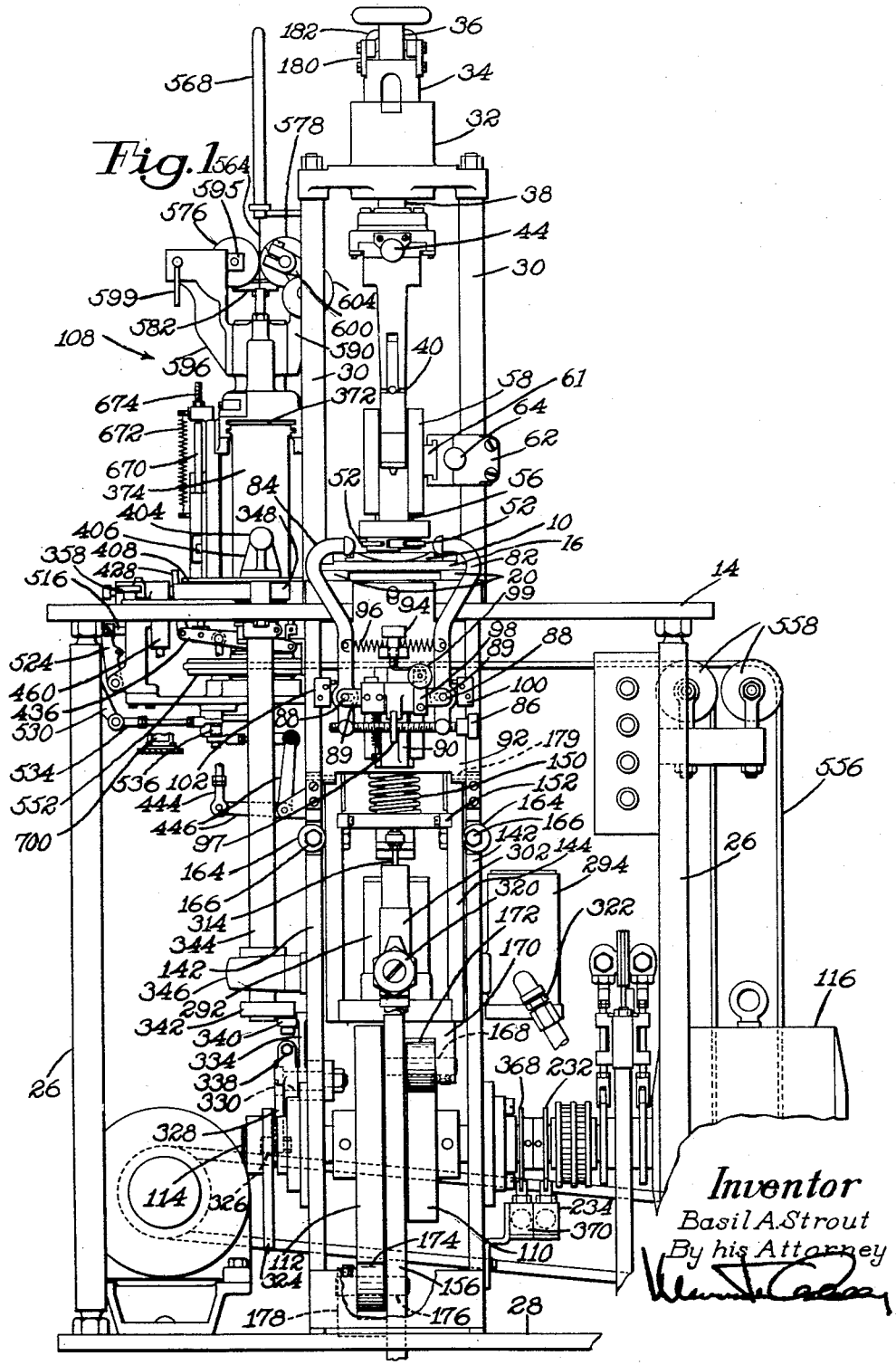
Fig. 1 is a front elevation of an illustrative machine embodying the invention.
Figure 2:
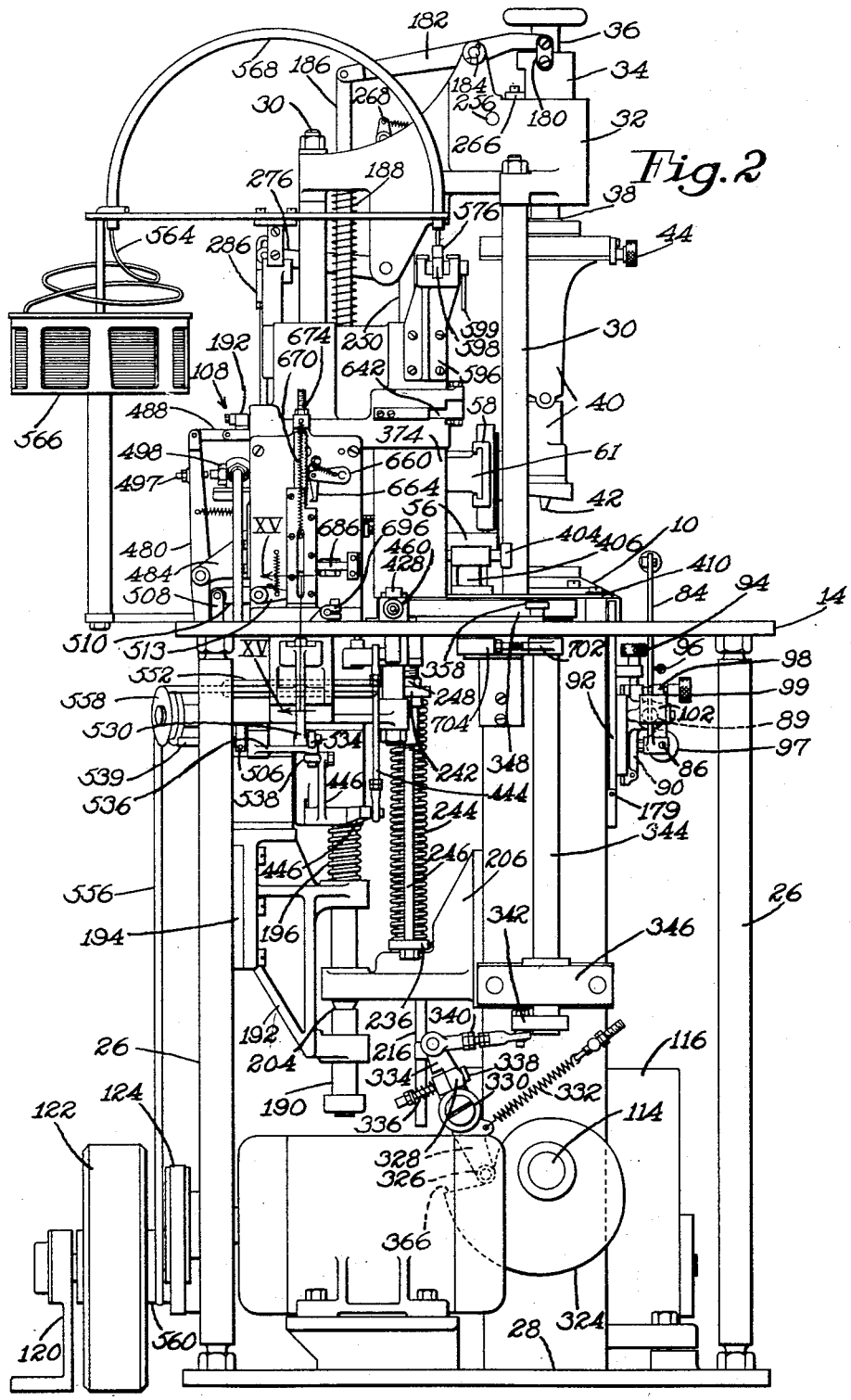
Fig. 2 is a side elevation of the machine as viewed from the left.

A lasted shoe, upon which a heel seat fastening operation is to be performed in the illustrated machine, is presented to the machine with the heel seat of the shoe resting upon a work support 10 (Figs. 4, 1 and 2) the upper surface of which is cupped to shape the heel seat and is provided with a series of perforations suitable for accommodating different sizes of shoes or different fastening designs. The work support is detachably mounted upon a table 14 in a guide 16 to the top of which are secured gibs 18 which, with the guide, form a T-slot slideway for receiving the work support. A pin 19, held by the left-hand gib 18, enters a recess in the support to lock the support in its operative position. The guide 16 is supported above the table upon blocks 20 which are fixed to the table and have threaded therein screws 22 for holding the guide at a variable height above the blocks, as determined by a series of screws 24, the latter being threaded in the guide and adapted to seat upon the blocks. The support 10 rests upon a disc 25 which is set into the guide flush with its upper surface.

The table is supported by a series of legs 26 which are fixed upon a base plate 28 having, at each corner thereof, a foot 29 (Fig. 6) which rests upon the floor. Fixed upon and rising from the table 14 are three posts 30 (Figs. 1, 2 and 7) which fixedly support a head 32 in which a sleeve 34 is mounted for vertical sliding movement. A hand screw 36, rotatably mounted in the sleeve 34, is threaded into a carrier 38 for a holddown 40, the lower end of which is adapted to engage the upper surface of the heel part of a last carrying the shoe to be operated upon and has a pin 42 which is received in the thimble of the last. The holddown 40 is mounted in a slideway in the carrier 38 for adjustment forwardly and rearwardly of the machine, this adjustment being effected by turning a screw 44 which is rotatably mounted in the carrier 38 and is threaded into the holddown. Vertical adjustment of the initial position of the holddown is effected by turning the above-mentioned screw 36, which raises or lowers the carrier 38 within the sleeve 34.

The heel end of the shoe is centered upon the support, i.e., positioned laterally and lengthwise of the shoe, by a centering device 46 (Figs. 10, 1, 2 and 7), comprising a pair of arms 48, 50 upon the forward ends of which are rotatably mounted rolls 52, 52 adapted to engage the sides of a shoe inserted between them. The arms 48, 50 are pivoted upon a stud 54 which projects from the bottom of a bracket 56, the latter being mounted for adjustment vertically in a cross slide 58. Screws 60 threaded into the cross slide and engaging the bracket hold it in adjusted position on the cross slide. The cross slide 58 is mounted to slide laterally of the machine upon a bracket 61 which slides forwardly and rearwardly of the machine in a support 62, the latter being clamped upon the right forward post 30. Adjustment of the bracket 61 is effected by a screw 64 which is rotatably mounted in the support 62 and is threaded into a lug 66 formed on one end of a stud 68. The stud extends through a slot in the support and is fixed to the bracket. The forward ends of the arms 48, 50 are biased toward each other by springs 70, 72, respectively, which are stretched between the rear ends of the arms and the bracket 56, the normal positions of the arms being determined by screws 74 which are threaded into the bracket 56 and are adapted to be engaged by the rear portions of the arms.

Upon forcing the shoe rearwardly between the rolls 52, 52 the arms 48, 50 are swung into engagement with a pin 76, fixed upon the bracket 56, which limits the separation of the rolls and, therefore, the rearward movement of the shoe into the machine. Similarly, the heel end of the shoe is positioned laterally thereof and hence, by proper use of the adjustments for the centering device 46 referred to above, provision is made for properly locating the heel portion of the shoe with respect to the work support 10, laterally and lengthwise of the shoe.

The arm 50 has mounted thereon a microswitch 78 which is operated by a finger 80 fixed upon the arm 48. The microswitch is closed by the finger 80 when, but not until, both arms 48, 50 are brought into engagement with the pin 76. The closing of the microswitch 78 closes a part of a circuit which, when it is fully closed, initiates a cycle of operation of the machine.

The forepart of a shoe presented to the centering device 46, as above described, is disposed between a pair of arms 82, 84 (Figs. 1 and 2) which are connected at their lower ends by a right and left-hand threaded adjusting screw 86. Each arm has a horizontal elongated slot therein which receives a pin 88 mounted on a rod 89 rotatably mounted in a slide 90. The slide is adjustable heightwise within a slideway formed upon a cover 92, this adjustment of the slide being effected by a screw 94 which is rotatably mounted upon the cover and is threaded into the slide. The arms 82, 84 are biased toward each other by a spring 96 which is stretched between the arms and the normal spacing of the arms, laterally of the machine, is under the control of the screw 86, axial movement of which is prevented by the engagement of a flange 97 on the screw within a slot formed in the slide 90. A split ring 98, which receives the rod 89 and is carried by the slide 90, is clamped against the rod by a screw 99 threaded in the ring. Accordingly, limited fore and aft adjustment of the arms, about the axis of the rod 89, is provided.

Associated with and operated selectively by the arms 82, 84 are microswitches 100, 102, respectively, either of which, when closed, further contributes to the complete closure of the above-mentioned circuit, including the microswitch 78, for initiating a cycle of operation of the machine.

When a right shoe is presented to the machine, as described above, and its heel portion has been centered with respect to the support 10, the toe end of the shoe is swung to the right (Fig. 1) into engagement with the arm 82, causing the microswitch 100 to be closed when the heel seat of the shoe is properly oriented upon the support. Similarly, when a left shoe is presented to the machine, its toe end is swung to the left, displacing the arm 84, and causing the microswitch 102 to be closed.

Following the closure of either microswitch 100, 102 and through mechanism presently to be described, the holddown 40 is immediately lowered to clamp the shoe upon the support, first with a preliminary pressure and, immediately thereafter, with a heavier pressure which is maintained until near the end of each cycle of operation of the machine. With the application of the final clamping pressure to the shoe, a driver unit 104 (Figs. 4 and 11) is elevated to prick holes through the work up to the last bottom and then is lowered out of the way of a loader block 106 (Fig. 3) which is now swung, with a load of fasteners, from its fastener receiving position, as illustrated in Fig. 3, into register with the driver unit. There is next imparted to the driver unit a driving stroke by which fasteners are driven upwardly out of the loader block, through the work support, and into the work substantially flush with its bottom surface. Following this driving stroke of the driver unit, it is again returned to its original position below the loader block, and the block is automatically returned to its fastener receiving position. In response to such return movement of the loader block, there is actuated a cycle of operation of a fastener forming device 108 which automatically supplies to the loader block, immediately upon its arrival in its fastener receiving position, the required number of fasteners for use in the succeeding operating cycle of the machine, these fasteners having been made at the end of the previous operating cycle of the machine.

With the machine at rest, the driver unit 104 is disposed at the bottom of its stroke under the control of driver operating mechanism next to be described. The pricking and driving strokes of the driver unit are effected by a two-lobed cam 110 (Fig. 6), the pricking return and driving return strokes being effected by another cam 112, these cams being of conjugate design and being keyed together upon a main drive shaft 114 which, at its right-hand end, is connected to a gear reduction unit 116. This unit has an input shaft 118 which extends to the rear of the machine where it is supported by an anti-friction bearing carried by a bracket 120 which is fixed upon one of the feet 29. A flywheel 122 is freely rotatable upon the shaft 118 and is constantly rotated by a motor-driven belt 124, the flywheel having, at the forward end of its hub, a drive shoe 126 with which there may be engaged a clutch collar 128, the latter being splined upon the shaft 118. At the side of the collar 128 opposite to the drive shoe 126, a brake shoe 130 is fixedly mounted upon a bracket 132 which is secured to the base plate 28. The clutch collar 128 is normally held away from the drive shoe 126, in engagement with the brake shoe 130, by a bell crank 134, pivoted at 135 upon a fixed pad, the lower arm of the crank being forked and carrying a pair of pins 136 which are received in a groove in the clutch collar 128. The other arm of the bell crank is connected, by a link 138, to an upwardly biased armature of a solenoid 140 which is mounted upon the base plate 28.

The drive shaft 114 is rotatably mounted in the lower portions of a pair of plates 142 (Figs. 1 and 11) which are arranged vertically, parallel to each other, and are secured to the table 14 and base plate 28 at their upper and lower ends, respectively. There is mounted to reciprocate vertically, between the plates 142, a driver carrier 144, the inner upper sides of which are provided with splines 146 for guiding for vertical movement upon the carrier a holder 148 for the driver unit 104. The holder 148 is biased upwardly by a spring 150 which is compressed between the lower side of the holder and a brace 152 which extends between the sides of the carrier 144. Upward movement of the holder 148 in the carrier is limited by a pair of blocks 154 which are fixed upon the carrier at its upper end. Integral with and extending downwardly from the carrier is a tongue 156 which is slotted at 157 to receive the drive shaft 114 by which fore-and-aft guidance of the carrier at its lower end is effected. Similar guidance of the carrier, near its upper end, is effected by a pair of rolls 158, 158 (Fig. 11) which are mounted upon studs 160 secured upon the side of the carrier 144, the rolls 158 being received within vertical slots 162 formed in the plates 142. Lateral guidance of the carrier is effected by two sets of rolls 164 which, for purposes of adjustment, are eccentrically bored and may be fixed in juxtaposition to the carrier by bolts 166 which are threaded into the plates 142. One set of these rolls is provided at the front edges of the plates 142 and another set is provided at the rear edges thereof. Further lateral control of the carrier 144 is afforded by the tongue 156 which closely fits between the cams 110, 112. A shaft 168 (Figs. 6 and 1), supported by the tongue 156 and a bracket 170 mounted upon the bottom of the carrier, has rotatably mounted thereon a roll 172 which runs upon the cam 110. Another roll 174, which runs upon the cam 112, is rotatably mounted upon a shaft 176 which is carried at one end by the tongue 156 and at the other end by a bracket 178, the latter being secured upon the tongue.

The driver unit 104 comprises a plurality of drivers 104a (Figs. 4 and 11) which are pressed into holes in a block 104b, the holes being of such number and arrangement as is required by the fastener pattern. The lower ends of the driver's seat upon a plate 104c which is fixed upon the bottom of the block, the lower portion of the block and the plate being received in a T-slot formed in the upper portion of the holder 148. The upper portions of the drivers are guided by a plate 104d which is perforated to receive the drivers and is received in slots bounded by the table 14 and the blocks 20. To the plate 104d there are fixed a pair of guide rods 104e which have a free sliding fit within holes bored in the block 104b and the plate 104c.

The driver unit 104 is disposed behind the above-mentioned cover 92, which is hinged at 179 (Fig. 1) upon the plates 142, to provide access to the driver unit, and is locked closed by a bolt arranged to cooperate with the guide 16.

The holddown sleeve 34 (Fig. 7) is operated by connections, next to be described, extending between the sleeve and the carrier 144. A pair of links 180 connect the sleeve 34 with the forward forked ends of a lever 182 which is pivoted at 184 upon the head 32, the rear end of the lever being pivotally connected to a rod 186 which is biased downwardly by a spring 188 compressed between the head and a collar fixed upon the rod. The rod is normally seated at the bottom of an axial recess in a plunger 190 (Figs. 8 and 2) which is mounted to slide freely vertically within a bracket 192, the bracket being carried by a bar 194 fixed to and connecting the rear legs 26. The plunger 190 is biased upwardly by a spring 196 which is compressed between the bracket 192 and a washer 198 which may be set to adjust the stress in the spring by means of a nut 200 threaded on the plunger. When the machine is at rest, the plunger is held in its lowermost position by a catch 202 (Figs. 9 and 8) which seats upon a shoulder 204 formed upon the shaft 190, the catch being mounted to slide off the shoulder 204 within a bracket 206 which is fixed upon the rear side of the carrier 144. The catch is normally biased into operative relation to the shoulder 204 by a spring 208 which is stretched between the bracket 206 and an arm 210 to which the catch is pivotally connected by a pair of links 212, 212. The arm 210 is fixed upon one end of a shaft 214 which is rotatably mounted upon the bracket 206 and has fixed upon its other end an arm 216 which normally lies in contact with a roll 218 on a bell-crank lever 220. This lever is rotatably mounted at 222, upon a block 223 fixed upon the rear edge of the right-hand plate 142, and is biased by a tensioned spring 224 so as to hold a stop pin 226 on the lever against the block 223, the pin being so located that the roll 218 is in juxtaposition to the arm 216. The lever 220 is also connected by a rod 228, biased upwardly by a tensioned spring 230, to the armature of a solenoid (not shown).

The last-mentioned solenoid is energized upon the closure of the above-mentioned microswitch 78 and either one of the microswitches 100, 102, whereby the rod 228 is lowered and, through the connections just described, the catch 202 is withdrawn from the shoulder 204. This results, as will presently be described, in the application of preliminary pressure by the holddown 40 to the shoe on the support 10 and thereafter, following a very short time delay, the above-mentioned solenoid 140 is energized to cause one complete revolution to be imparted to the main drive shaft 114. The termination of each revolution of the shaft 114 is controlled by a cam 232 (Fig. 1) on the shaft 114 which operates a microswitch 234, for deenergizing the solenoid 140, soon enough before the revolution of the shaft 114 is completed to allow the clutch collar 128, cooperating with the brake shoe 130, to stop the shaft 118 at the proper time.

Upon the release of the catch 202 from the plunger 190, the latter rises under the influence of the spring 196, carrying upwardly the rod 186 and causing the holddown 40 to press downwardly upon the last with a pressure derived from the spring 196. Immediately thereafter, upon the energizing of the solenoid 140 and, consequently, the beginning of a revolution of the drive shaft 114, the carrier 144 begins its pricking stroke, under the influence of the pricking lobe of the cam 110 (Fig. 6), to the left of the shaft 114. With movement of the carrier upwardly and derived therefrom, an increased final clamping pressure is imparted to the holddown 40 by the following connections.

Seated upon the bracket 206 (Figs. 8 and 2) is a bar 236 which freely receives a rod 238 which is threaded at its upper end into a turnbuckle 240, the lower end of the rod having a free sliding fit within a bore in the bracket. Another bar 242 is threaded upon the rod 238 and forms the upper abutment for a spring 244 which encircles the rod 238 and engages at its lower end the above-mentioned bar 236. A pair of rods 246 (Fig. 2) are threaded into the bar 236, one at each side of the spring 244, and carry nuts 248 threaded upon their upper ends above the bar 242 for adjustably limiting the possible expansion and varying the initial stress of the spring. Another rod 250 (Fig. 7) is threaded into the upper end of the turnbuckle 240 and is pivoted at 252 to a lever 254 which is mounted to swing vertically upon a pin 256 carried by the head 32. The forward end of the lever 254 has pivoted thereon, at 258, a pawl 260 which is biased forwardly, by a spring-operated detent 262, toward a ratchet 264 which is fixed upon the rear side of the sleeve 34. The pawl is normally held out of engagement with the ratchet by a plate 266, fixed upon the head 32, which is engaged by a tail on the pawl when the lever 254 is at rest, as illustrated in Fig. 7.

It will now be evident that, during the pricking stroke, the spring 244 and rods 238, 250 will be bodily raised by the bracket 206, causing the pawl 260 to be lowered away from the plate 266, whereby the pawl 260 will become engaged with a tooth on the ratchet 264. Further upward movement of the bracket 206 results in compression of the spring 244, the pressure of which is now delivered to the holddown, through the above-described connections, in an increasing amount exceeding that of the preliminary pressure, up to the end of the pricking stroke. During the development of the final clamping pressure, a pawl 268, which is pivoted at 270 upon the rear end of the lever 254, moves upwardly along a ratchet 272 toward which the pawl is urged by a spring 274 stretched between the lever 254 and a tail on the pawl. The ratchet is carried by a vertical arm on a bell crank 276 which is pivoted at 278 upon the head 32, the bell crank being urged by a spring 280 stretched between it and the head so as to hold the ratchet 272 against a stop pin 282 fixed in the head. This stop pin also limits rearward movement of the above-mentioned pawl 268. Thus, the pawl 268 and ratchet 272 will hold the lever 254 in that position to which it is brought at the end of the pricking stroke, whereby the maximum and final clamping pressure applied to the holddown 40 is maintained after the return pricking stroke begins. The final clamping pressure is not released until nearly the end of each cycle of operation of the machine, such release being effected upon the energizing (to be referred to later) of a solenoid 284 (Fig. 8) having an upwardly biased armature to which is pivoted a rod 286 having a slotted fitting (Fig. 7) at its upper end which receives a pin 288 fixed upon the lower arm of the bell crank 276.

The cam 110 (Fig. 6) has an abruptly rising slope between the radii O—A which, upon being presented to the roll 172, causes the driver unit 104 to be brought close to, if not into, engagement with the work; and the corresponding movement of the carrier 144 is sufficient to cause a large proportion of the final clamping pressure to be exerted by the holddown upon the work. During the subsequent presentation of a more gradually rising slope of the cam 110, between the radii A—B, to the roll 172, still greater yielding clamping pressure is exerted upon the work by the holddown as the pricking of the work is effected by the driver unit. However, before the pricking operation is completed the pricking pressure exceeds the holddown pressure and, from this time throughout the remainder of the pricking operation, the pawl 268 and ratchet 272 positively prevent the work from rising off the work support 10. The radius B of the cam 110 is greater than is necessary to cause the driver unit completely to penetrate the shoe parts below the bottom plate on the last and any excess movement of the carrier 144 is compensated for by a yielding action of the driver unit with respect to the carrier, as will next be described.

A piston 290 (Figs. 12 and 11) fixed upon the bottom of the holder 148, is received in a cylinder 292 which is fixed on the bottom of the carrier 144 and is filled with oil from a reservoir 294 by a duct 296 including a check valve 298 which prohibits the flow of oil from the cylinder toward the reservoir. The bottom of the cylinder 292 communicates, through a nipple 300, with a valve 302 having a pressure relief element 304 which is biased by a spring 306 against a seat 308. The valve also has a cylindrical chamber 310 having ports 312 which are normally closed by a piston 314 which slides freely within the chamber 310. This piston is fixed to a jointed arm 316, the latter being clamped upon the piston 290 in such a position that when the holder 148 is in engagement with the blocks 154 on the carrier 144, the ports 312 are just covered by the piston 314 at its upper edge. The piston 314 has a series of holes 318 passing entirely through it from one end to the other, for a purpose to be explained later.

The compression in the above-mentioned valve spring 306 is so adjusted by a screw 320, threaded into the valve 302, as to cause the piston 290 to be supported, by the fluid pressure in the cylinder 292, against whatever resistance is presented by the work to the driver unit 104 until the ends of the drivers closely approach the bottom plate of the last. At this time, the pressure between the work and the drivers builds up rapidly because the material immediately above the ends of the drivers becomes densely compressed against the non-yielding bottom plate on the last; and this pressure, if not adequately relieved, may cause damage to the ends of the drivers or to the last bottom itself. Moreover, such relief of the pressure between the drivers and work, to be effective, must be effected with extreme rapidity, and under certain control. After a maximum allowable pressure between the work and the drivers will have been developed, fluid is vented from the cylinder 292, through connected axial and radial holes in the seat 308, past the element 304 which will have been moved away from the seat by fluid pressure exerted against the forward annular end of the element 304. This oil is returned to the reservoir 294 through a duct 322 which connects the valve 302 with the reservoir. With such venting of the cylinder 292, upward movement of the cylinder relatively to the piston 290 occurs, whereby the further rapid development of pressure between the drivers and work is prevented. At this time, the carrier 144 rises relatively to the holder 148, creating clearance vertically between the blocks 154 and the portions of the holder previously engaged by the blocks. Immediately upon the occurrence of such relative movement between the carrier and holder, the ports 312 in the valve 302 rise above the piston 314, effecting the further venting of oil from the cylinder 292 through the holes 318 in the piston and thence, through the duct 322, back to the reservoir. As there is substantially no resistance to this venting action, the bearing pressure between the drivers and work is nearly eliminated abruptly.

When the radius B (Fig. 6) of the cam 110 passes the roll 172, the return pricking stroke of the carrier 144 takes place, and this stroke terminates when a concentric portion of the cam (which terminates at radius C) is presented to the roll. As the carrier 144 (Fig. 11) first falls, it moves relatively to the holder 148 until the blocks 154 are lowered into engagement with the holder, the latter being biased upwardly by the spring 150. As soon as engagement is resumed between the blocks 154 and the holder 148, the driver unit drops with the carrier to the bottom of the pricking return stroke. With the driver unit in this position, the top ends of the drivers are disposed below the path of movement of the loader block 106 into register with the drivers at the operating station. During the latter part of the return pricking stroke of the driver unit, the loader block 106 is moved away from its fastener receiving position (Fig. 3) to transfer to the operating station a group of fasteners to be inserted into the work during the succeeding driving stroke of the driver unit.

The operating mechanism for the loader block 106, next to be described, comprises a cam 324 (Figs. 1 and 2) fixed upon the left-hand end of the drive shaft 114, upon which runs a roll 326 rotatably mounted upon a lever 328. This lever is pivoted upon a stud 330 which is fixed upon the left-hand plate 142 and is biased by a spring 332, stretched between the lever and the above-mentioned plate, so as to urge the roll 326 toward the cam 324. Also pivoted upon the stud 330 is an arm 334, which is yieldingly driven by the lever 328 through a spring 336, the latter being compressed between a lug on the arm 334 and a nut threaded on the rear end of a bolt 338 which passes freely through the lever 328 and arm 334 and has a head which is seated upon the lever 328. The upper end of the arm 334 is connected by a link 340 to a crank 342 fixed upon the lower end of a shaft 344 mounted to rotate in a bearing 346 fixed to the left-hand plate 142 near the lower end of the shaft. At its upper end, the shaft is rotatably mounted in the table 14 and has fixed thereon an arm 348 (Fig. 3) to which the loader block 106 is attached by screws 350, so as to permit loader blocks having different numbers or arrangements of fastener receiving holes to be readily interchanged.

A hole 352 is provided in the table 14 through which a load of fasteners in the loader block may be discharged, if desired, by swinging beyond the hole a cover 354 which is pivoted at 356 upon the table and is locked thereto in its operative position (Fig. 5), immediately below and covering the entire bottom of the loader block 106, by a spring-operated detent 358 which is received in a hole in the table.

The right-hand edge of the cover 354 is contiguous to one edge of a plate 359, the upper surface of which is flush with the cover 354 and the plate 104d. The plate 359 is fixed upon the table 14 with its forward edge contiguous to the rear edge of the plate 104d. Thus, fasteners in the loader block 106 are prevented from falling out of the loader block 106 throughout its travel.

The loader arm 348 is positioned, in the fastener receiving position, by a pin 360 (Figs. 3 and 18) mounted to reciprocate vertically through the table 14, as will be described below. Forward movement of the loader block is limited, upon its arrival into register with the driver unit, by an adjustable stop screw 362 (Fig. 3) which is threaded into a bracket 364 fixed upon the lower side of the guide 16. Upon the engagement of the loader block with the stop screw 362, yielding lost motion of the lever 328 occurs relatively to the arm 334, as permitted by the spring 336. The loader block is thus held yieldingly against the screw 362 throughout the period during which the drivers extend into the loader block.

The fasteners just delivered to the operating station of the machine are next driven into the work during the driving stroke of the driver unit, which occurs while a rising slope on the cam 110 (Fig. 6), beyond the radius C, is presented to the roll 172. This driving lobe of the cam has a lesser radius D than the radius B of the lobe for effecting the pricking stroke of the drivers and is designed to cause the drivers to rise substantially flush with the upper surface of the work support, this relation between the drivers and the work support being adjustable, by the use of the above-mentioned bolts 22, 24, according to whether the fasteners are to be set above, below, or flush with the surface of the work through which they are driven.

With further rotation of the cam 110, a falling slope beyond the radius D is presented to the roll 172, during which time the driving return stroke of the driver unit takes place. When the radius O arrives at the roll 172, the rotation of the shaft 114 is stopped in response to the operation of the above-mentioned microswitch 234, by the cam 232, which causes the solenoid 140 to be deenergized and the clutch collar 128 to be moved into operative relation to the brake shoe 130.

After the drivers have been lowered, during the driving return stroke of the driving unit, out of the loader block 106, an abrupt drop 366 (Fig. 2) on the cam 324 is presented to the roll 326, which permits the loader arm 348 to be swung, by the spring 332, back to its fastener receiving position. During the mid-portion of the driving return stroke, a cam 368 (Fig. 1) on the main drive shaft 114 operates a microswitch 370 so as to energize the above-mentioned solenoid 284 (Fig. 8) whereby the rod 286 causes the bell crank 276 (Fig. 7) to move the ratchet 272 out of engagement with the pawl 268 and the clamping pressure of the holddown 40 is removed from the last. The holddown now rises to its upper position under the influence of the spring 188, first as fast as the lowering of the bracket 206 permits, and finally with an abrupt motion when the pawl 260, upon engaging the plate 266, is disengaged from the ratchet 264.

Although a complete fastening inserting operation has now been completed, the machine having employed in this cycle of operation a supply of fasteners which were already made, a complete cycle of operation of the machine is not concluded until another set of fasteners has been supplied to the empty loader block and still another set of fasteners have been produced by the fastener forming device 108 in which the fasteners last made are held by a shutter 372 (Figs. 20 and 1) above a distributor 374. Upon the return of the loader block 106 to its fastener receiving position, the shutter is operated to free the fasteners, and the distributor directs the fasteners into the loader block.

The distributor comprises a top plate 376 (Fig. 20) which is mounted to slide, into operative relation to the device 108, in grooves 378 formed in a frame 380 of the device 108. The top plate has a series of holes 382 arranged in a circle and in number sufficient to accommodate the maximum number of fasteners which can be made in one cycle of operation of the device 108. To the front and rear sides of the plate 376 are fixed struts 384, 386, respectively, having attached to the bottom thereof a rectangular ring 388 upon which is detachably mounted, by means of screws 390, a bottom plate 392 having a series of holes 394 formed therein in number and design suited for the operation to be performed. Seated upon the top plate 376 is a cover plate 396 having a hole 398 therein for each hole in the bottom plate 392. The cover plate 396 also has formed therein a pair of holes 400 which receive a pair of pins fixed in the top plate 376, so as to cause the holes 398 in the cover plate to be disposed in register with a series of holes in the top plate 376 which are connected by flexible tubes 402 to the holes 394 in the bottom plate 392. For a purpose to be explained later, the unused holes in the top plate 376 are covered by the plate 396. It is evident that various distributors 374, having fastener designs of different number or arrangement, may be interchangeably mounted in the device 108. Similarly, if desired, a distributor may be modified to accommodate any desired fastener design by a proper selection of related cover plates 396 and lower plates 392, and the use of the proper number of the tubes 402 with the top and bottom plates 376, 392. The distributor 374 is held in operative relation to the device 108 by a spring-operated plunger 404 (Figs. 1 and 2) which is mounted to slide in a bracket 406, the latter being carried by a plate 408 which is mounted to swing upon the table 14, at 410, so as to carry the bracket and plunger 404 to one side of the distributor, permitting its removal from the device 108. As will be described more fully later, the distributor has threaded into its rear strut 386 (Figs. 20 and 22) a stop screw 412 which is adjustable into a position corresponding to the capacity of the distributor and, when the distributor is assembled in the machine, cooperates with the device 108 to limit its production of fasteners per cycle of operation to the capacity of the distributor.

Figure 17:
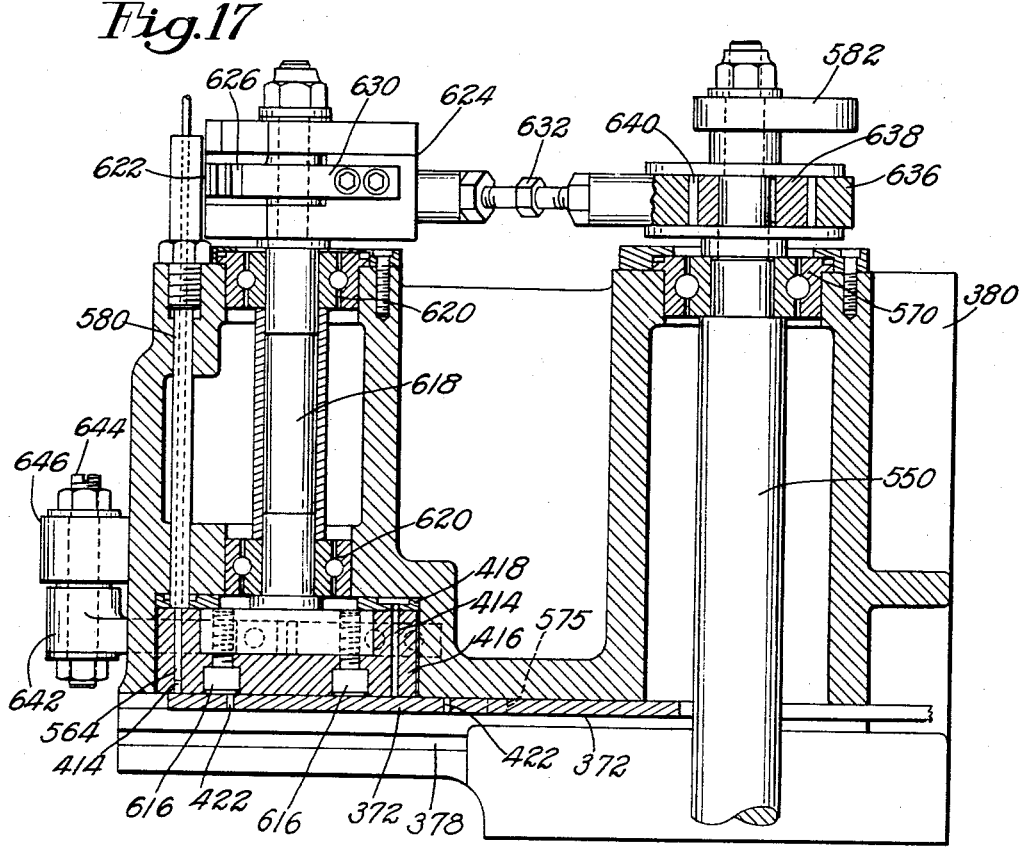
Fig. 17 is a sectional elevation of the structure of Fig. 16 as viewed from the right, the section being indicated by the line XVII—XVII.

The above-mentioned gang of fasteners, awaiting release by the shutter 372 for delivery to the loader block 106, are disposed within a series of holes 414 (Figs. 17 and 20), in a rotary shear block 416, corresponding to and in register with the holes 398 in the cover plate 396. The shear block has a total number of holes 414 corresponding to the number of holes 382 in the top plate 376, and above the shear block there is fixed, in the frame 380, a ring 418 having a similar number of holes which communicate with an annular channel 420 formed in the upper surface of the ring, to which compressed air is supplied from a pipe 420 which is threaded into the frame 380.

The above-mentioned shutter 372 has formed therein a series of holes 422, in number and arrangement like the above-mentioned holes 382, and is normally locked, with its holes out of register with the holes 414 in the shear block 416, by a rod 424 (Figs. 18 and 19) which is mounted to slide vertically in the frame 380 and is biased upwardly by a spring 426, the latter being compressed between the bottom of the frame 380 and a collar fixed upon the rod.

Figure 18:
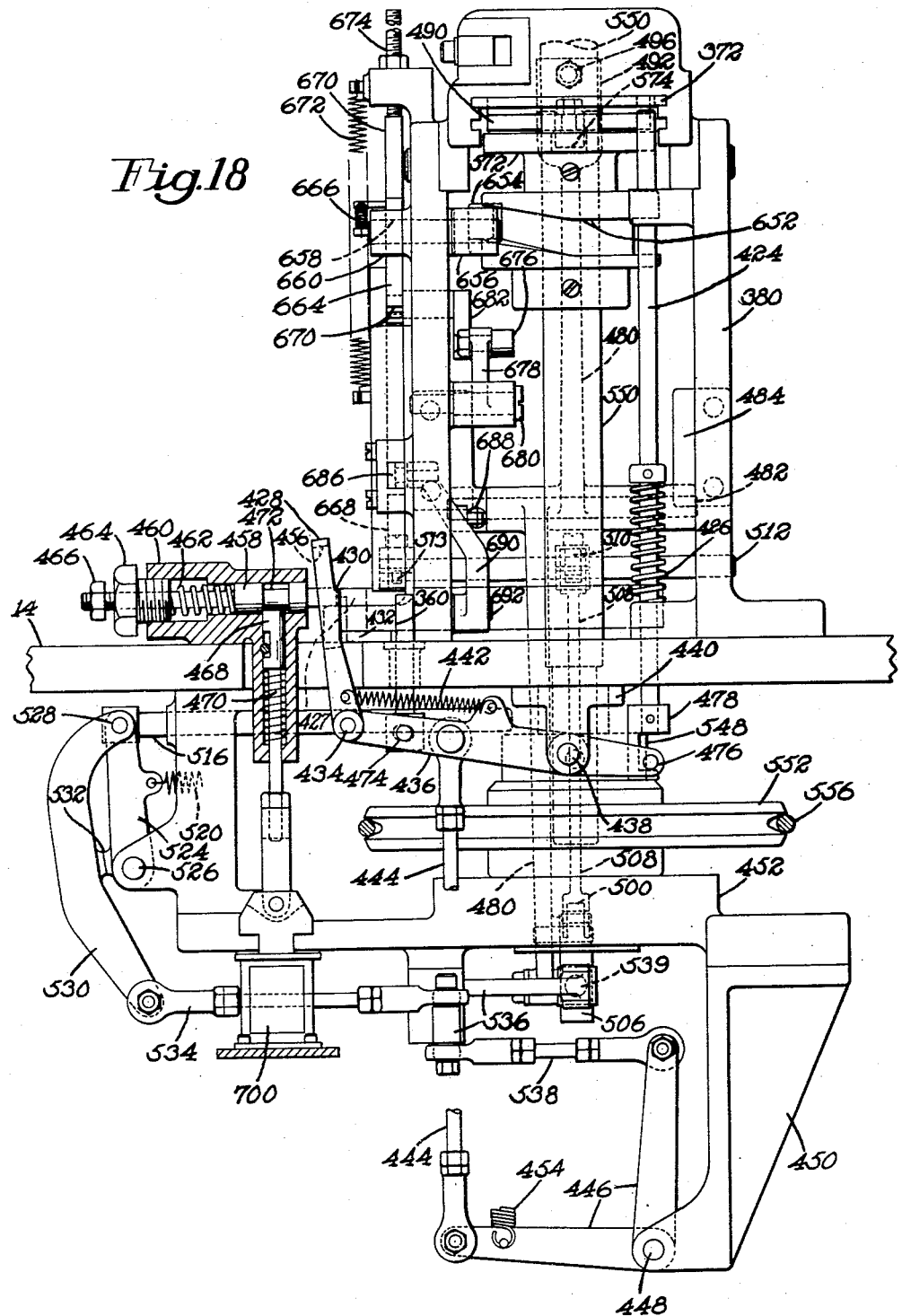
Fig. 18 is a front elevation of operating and control mechanism for the fastener forming device shown in Fig. 1, but at an enlarged scale.
Figure 19:
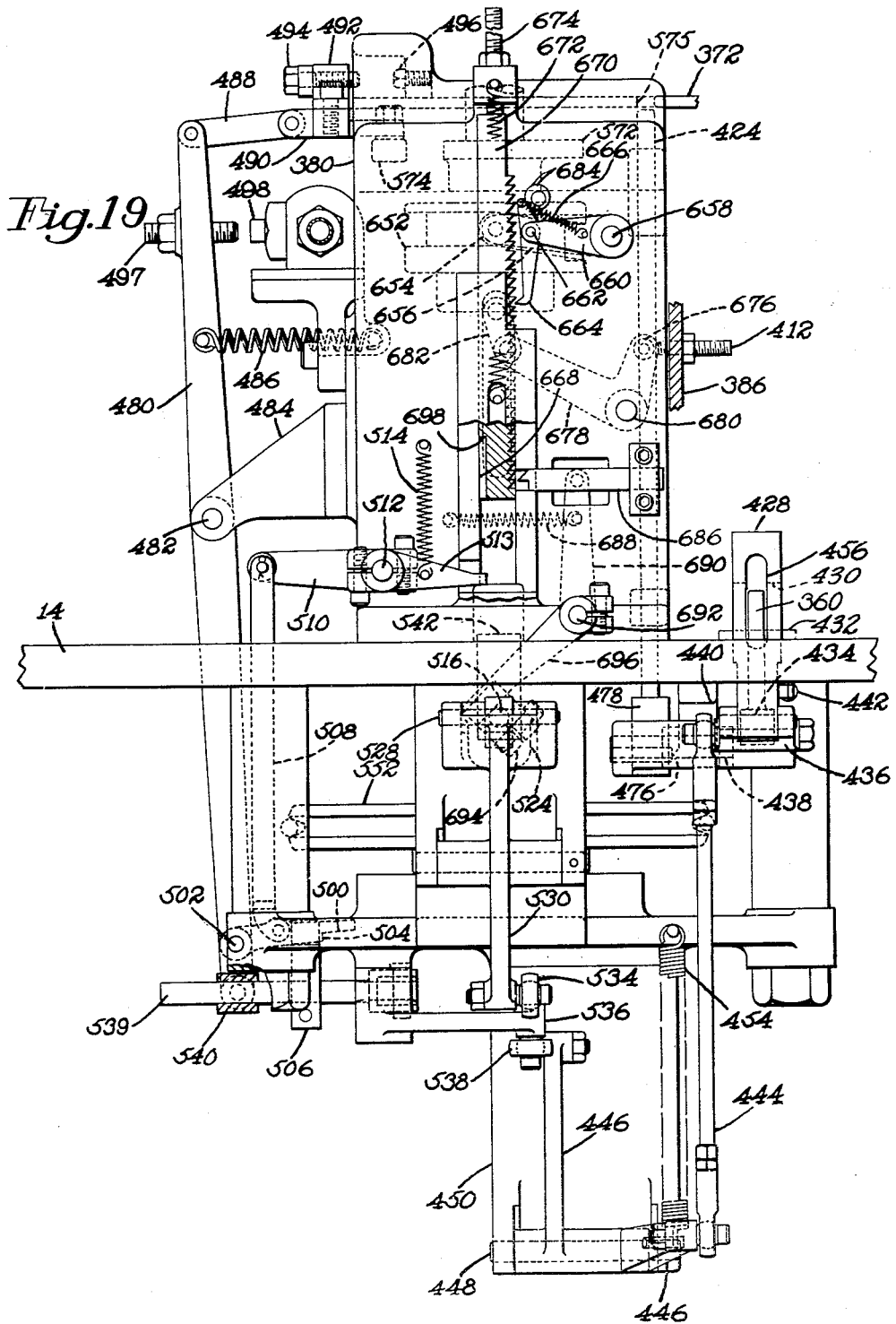
Fig. 19 is a side elevation of the structure of Fig. 18 as viewed from the left, also showing at an enlarged scale the corresponding structure of Fig. 2.

Near the end of the return movement of the loader block 106 to its fastener receiving position, a lug 427 (Fig. 3), on the arm 348 and overhanging its left side, strikes and swings a latch 428 (Fig. 18) to the left, unseating a shoulder 430 on the latch from a lip 432 fixed upon the table 14. The latch is pivoted at 434 upon a lever 436 which is fulcrumed at 438 upon a bracket 440 which is secured to the table 14. The latch 428 is biased to the right by a spring 442 stretched between it and the lever 436 and is biased upwardly by connections comprising a link 444 which pivotally connects the lever 436 with a horizontal arm of a bell crank 446, the latter being pivoted at 448 upon a bracket 450 which is fixed to a sub-frame 452 secured to the bottom of the table 14. The bell crank 446 is biased clockwise by a spring 454 which is stretched between the sub-frame 452 and the bell crank. To the left of the latch 428, and extending through a hole 456 therein, is a buffer plunger 458 which is mounted to slide axially thereof in a holder 460, secured to the table 14, against a compression spring 462, the normal stress in which can be adjusted by turning a screw 464 threaded in the holder 460. Before the loader arm 348 strikes the latch 428, the plunger 458 projects out of the holder 460, to the right, beyond the position in which it is illustrated in Fig. 18 and as limited by a nut 466 threaded upon the left-hand end of the plunger. Upon snubbing the return movement of the loader arm 348, the plunger 458 is locked in its retracted position, as shown in Fig. 18, by a latch 468 which is urged in the holder 460 by a spring 470 into a peripheral recess 472 formed in the plunger.

Upon the release of the latch 428 from the lip 432, the above-mentioned pin 360, which is pivoted at 474 to the lever 436, is urged upwardly by the latter into engagement with the bottom of the loader arm 348 and, upon the arrival of the loader block 106 into the fastener receiving position (i.e., when the loader block is moved into register with the bottom plate 392 (Fig. 20) of the distributor 374), the pin 360 suddenly rises into a hole 476 (Fig. 3) in the arm 348 whereby the loader block is locked in its fastener receiving position. At the same time, the shutter 372 (Figs. 18 and 19) is operated to release the gang of fasteners immediately above it for delivery into the loader block 106 and a cycle of operation of the device 108, for the production of another gang of fasteners, is begun.

The above-mentioned operation of the shutter is permitted by the retraction therefrom of the rod 424, this being effected, in response to clockwise rotation of the lever 436, upon the engagement of a pin 476 fixed upon the right-hand end of the lever 436 with the lower end of a yoke 478 which is fixed upon the lower end of the rod 424. The shutter is normally biased against the rod 424, and toward its open position, by connections comprising a lever 480 (Fig. 19) which is pivoted at 482 (Fig. 19) upon a bracket 484 which is fixed upon the frame 380, the lever 480 being biased clockwise by a spring 486 which is stretched between the lever and the frame. A link 488 pivotally connects the upper end of the lever 480 with a bracket 490 upon which there is fixed the shutter 372 and a lug 492 having threaded therein an adjustable stop 494 which, upon engaging the head of a screw 496 threaded in the frame 380, positions the shutter in its open position (i.e., with the holes 422 in the shutter in register with the holes 414 in the shear block 416) whereby a gang of fasteners in the shear block 416 are released therefrom. Upon the arrival of the shutter into its open position, a screw 497 threaded in the lever 480 strikes and opens a valve 498 to which the above-mentioned pipe 420 is connected whereby a blast of air is transmitted to the holes 414 (Fig. 21) in the shear block through the channel and holes in the ring 418 and the fasteners are rapidly driven through the distributor into the loader block 106. It will now be evident that the cover plate 396, because it transmits air from only those holes 414 in the shear block holding fasteners, prevents the dissipation of the air blast into unused holes 382 in the top plate 376 of the distributor 374. Upon movement of the shutter into its open position, the lever 480 (Fig. 18) moves a latch 500, which is pivoted on the lower end of the lever at 502, to the left, whereby a shoulder 504 on the latch is carried to the rear of and falls behind a lug 506. The latch 500 is biased downwardly by connections comprising a link 508 which is joined to the latch and the left-hand end of an arm 510, this arm being fixed upon the mid portion of a shaft 512 which extends between and is rotatably mounted in the sides of the frame 380. Upon the left-hand end of the shaft 512 there is fixed an arm 513 which is biased upwardly by a spring 514 stretched between the arm and the frame 380.

Simultaneously with the release of the shutter 372 by the rod 424, in response to the operation of the lever 436, a trip rod 516 (Figs. 15 and 18) is withdrawn from a clutch 518, to start a cycle of operation of the fastener forming device 108. The trip rod is biased toward the clutch by a spring 520 which is stretched between a pin on a bracket 522 fixed to the table 14 and an arm 524 which is pivotally connected at its lower end at 526 upon the sub-frame 452, the lever being pivoted at its upper end, at 528, to the left-hand end of the trip rod 516. Retraction of the trip rod from the clutch is effected by connections comprising an arm 530 which is pivoted at 528 to the trip rod 516, is arranged to bear at its mild portion, at 532, against the arm 524, and at its lower end is connected by a link 534 with a forwardly extending arm of a bell crank 536 pivotally mounted upon the sub-frame 452. Another link 538 is pivotally joined to the bell crank 536, directly beneath its connection with the link 534, the link 538 being pivotally connected to a vertical arm on the above-mentioned bell crank 446. With swinging movement of the bell crank 536, accompanying the retraction of the trip rod 516, the above-mentioned block 506 is moved rearwardly by a rod 539, upon which the block is fixed, the rod being pivotally connected at one end to an arm of the bell crank 536 extending toward the right. The rear end of the rod 539 slides freely within a block 540 which is pivoted upon the lower end of the lever 480. Upon the full retraction of the trip rod 516, a notch 541 (Fig. 15), formed in the lower side of the rod, is brought into register with and receives a latch 542 for holding the rod retracted. The latch has an elongated hole through which the trip rod extends and is biased upwardly within a slot in the bracket 522 by a spring 544 compressed between the bracket 522 and a pin fixed in the latch.

The clutch 518 comprises a ring of variable width, providing a cam surface at its lower side, and a pin 546 which is fixed in the ring and is arranged to slide vertically within a bearing 548, the latter being pinned upon a shaft 550 which is the main drive shaft for the fastener forming device 108. The ring 518 is mounted to slide axially of the shaft along a reduced portion of the bearing 548 to permit, under the control of the trip rod 516, the pin 546 to be moved into and out of driving engagement with the hub of a pulley 552 which has a plurality of holes 554, any one of which may receive the pin. The trip rod 516 normally engages the lower level of the cam surface on the clutch 518 and holds the pin 546 above the holes 554 in the pulley 552. Upon the retraction of the trip rod from the clutch, the pin 546 drops into the hole 554 first to be brought beneath the pin, whereby a direct drive is established between the pulley and the shaft 550. The pulley 552 is driven by a belt 556 which is directed over idler pulleys 558 (Fig. 2) to a driving pulley 560 formed in the hub of the flywheel 122. The pulley 552 (Fig. 15) is mounted freely to rotate upon the sub-frame 452 by means of a ball bearing 562. With each complete revolution of the shaft 550, a fastener is cut from a continuous length of fastener material 564 (Fig. 2) coiled within a reel 566 and directed through a tube 568 downwardly into the device 108. Before proceeding with a detailed description of the device 108, there will be described the resetting of certain of the mechanism referred to above which occurs during the first revolution of the drive shaft 550, the upper end of which is rotatably mounted upon the frame 380 (Fig. 17) by means of a ball bearing 570.

Upon the shaft 550 at its mid-portion there is mounted a cam 572 (Figs. 18 and 19) which engages a roll 574 mounted upon the above-mentioned bracket 490 to which the shutter 372 is attached. The cam 572, soon after rotation of the shaft 550 begins, causes the lever 480 to be swung counterclockwise (Fig. 19) whereby the shutter 372 is moved rearwardly into its closed position and is automatically locked therein upon the entry of the upwardly biased rod 424 into a hole 575 in the shutter. With this movement of the lever 480, the above-mentioned shoulder 504 on the latch 500, acting against the lug 506, causes the above-mentioned latch 428 to be lowered enough to permit its upper end to swing underneath the bottom of the lug 427 on the loader arm 348 and the pin 360 to be withdrawn from the loader arm. At this time, the shoulder 430 on the latch 428 is slightly below and to the left of the lip 432 on the table 14. This resetting action is accompanied by idle swinging of the arm 530 (Fig. 18) to the left about the pivot at 528, causing a temporary separation at 532 between the arm 530 and the arm 524.

The fastener material 564 is intermittently fed, in an amount according to the length of the fastener desired, downwardly from the tube 568 between an idler wheel 576 (Fig. 1) and a drive wheel 578 into a tube 580 (Fig. 17) which is housed in the frame 380 and extends downwardly therein through the above-mentioned ring 418 into juxtaposition to the upper surface of the shear block 416. The fastener material is severed at the junction of the tube 580 and shear block 416, the block being rotated step by step, in alternation with the feeding movements of the fastener material, to shear a fastener from the fastener material inserted into the hole 414 under the tube and to present the next empty hole in the shear block to the tube, as will now be described.

Upon the top end of the drive shaft 550 there is fixed a cam 582 which engages a roll 584 (Fig. 14) carried by an arm 586, the arm being fixed upon a shaft 588 which is mounted freely to oscillate in a bracket 590 (Fig. 13) secured upon the frame 380. Fixed upon the drive wheel 578, which is mounted to rotate freely upon the shaft 588, is a ratchet disc 591 against which a pair of pawls 592 are biased. The pawls are pivoted upon an arm 593 which is fixed upon the shaft 588. Another set of pawls 594, pivoted upon the bracket 590 and biased against the ratchet disc, prevent retrograde movement of the ratchet disc. Thus, with each counterclockwise rotation of the shaft 588 the length of fastener material 564 desired for a fastener is driven out of the lower end of the tube 580 and into the shear block 416. The wheel 576 is rotatably mounted upon a slide 595 which is biased, in a bracket 596 fixed upon the frame 380, toward the wheel 578 by a spring-operated plunger 597, the latter being supported by an eccentric 598 which is rotatably mounted in the bracket 593. A handle 599 is provided for operating the eccentric so as to permit the wheel 576 readily to be withdrawn from the wheel 578, in order to facilitate the withdrawal of the fastener material from, or its insertion into, the machine.

The length of the feeding stroke of the wheel 578 is varied, to control the length of the fastener to be formed, by variably limiting the length of the return stroke of the shaft 588. This is effected by mechanism comprising an arm 600 which is fixed upon the shaft 588 and has rotatably mounted thereon a roll 602 which engages a stop cam 604, the latter being mounted to rotate freely upon a stud 608 which is fixed upon the bracket 590. The arm 600 is urged toward the cam 604 by a spring 610 stretched between the outer end of the arm 600 and a pin secured to the bracket 590. A spring operated detent 612, mounted upon the bracket 590 and urged into engagement with a toother disc 614 fixed to the rear side of the cam, holds the cam in whatever position it is set by the operator. As the cam 604 is turned to carry the roll 584 away from the cam 582, less and less of its throw is utilized and, hence, the effective feeding stroke of the wheel 578 can be varied according to the length of the fastener which is desired.

Following each feeding movement of the fastener material 564 into an empty hole 414 in the shear block 416, the latter is rotated through the angle separating successive holes 414 therein to form a fastener and to bring the next empty hole 414 into register with the tube 580. The shear block 416 is fastened, by means of screws 616 (Fig. 17), upon the lower flanged end of a shaft 618 which is rotatably mounted upon ball bearings 620 in the frame 380, the shaft having fixed upon its upper end a ratchet wheel 622. Rotatably mounted upon the upper end of the shaft 618 and partially housing the ratchet wheel is a carrier 624 for a pawl 626 which is pivoted at 628 upon the carrier and is biased into engagement with the ratchet by a spring 630, the latter being fixed upon the carrier. The carrier 624 is oscillated by connections comprising an adjustable link 632 which is pivoted at 634 to the carrier and is joined to an eccentric strap 636 which encircles an eccentric 638, the latter being keyed upon the upper portion of the above-mentioned shaft 550. A series of needle rolls 640 provide an anti-friction bearing between the eccentric 638 and the eccentric strap 636. The cam 582 and eccentric 638 are so arranged upon the shaft 550 as to effect the feeding of the fastener material 564 in alternation with the rotation of the shear block 416 which effects the severance of a fastener from the fastener material.

Register of the holes 414 in the shear block 416 with the tube 580 is effected by a pawl 642 which is pivoted at 644 upon a lug 646 which is integral with the frame 380. The pawl is biased by a spring 648, which is fixed upon the frame 380, into engagement with the periphery of the shear block 416 which is provided with a notch 650 for each of the holes 414 therein. Once the operation of the shaft 550 has been started, upon the retraction of the trip rod 516 from the clutch 518, a fastener is formed for each revolution of the shaft 550 until it is automatically stopped, upon the formation of a predetermined number of fasteners, as determined by a counting mechanism next to be described.

Fixed upon the shaft 550, immediately below the above-mentioned cam 572 (Figs. 18 and 19), is another cam 652 which is grooved to receive a roll 654, the latter being mounted upon an arm 656. This arm is fixed upon one end of a shaft 658 which is mounted to rotate freely in the frame 380; and a second arm 660, fixed upon the other end of the shaft 658 has pivoted thereon, at 662, a pawl 664 between the tail of which and a pin secured to the arm 660 there is stretched a spring 666. Opposite to the pawl 664 there is mounted, for free sliding movement vertically within a slideway 668 formed in the frame 380, a ratchet bar 670 which is biased upwardly by a spring 672, the latter being stretched between pins fixed upon the bar and the frame 380. A screw 674, threaded in the frame 380, constitutes one of two adjustable stops for limiting the upward movement of the ratchet bar. The other stop is constituted by the above-mentioned screw 412 on the distributor 374 which screw, upon upward movement of the ratchet bar, is adapted to be engaged by a roll 676 carried by one arm of a bell crank 678 which is pivoted at 680 upon the frame 380. The other rearward arm of the bell crank is connected to the ratchet bar by a link 682.

With each rotation of the shaft 550, the above-mentioned arm 660 is oscillated, first downwardly and then upwardly, according to the throw of the cam 652. With each downward movement of the arm 660, the pawl 664 is moved away from a stop 684 and, by the spring 666, into engagement with the ratchet bar 670; and the bar is lowered, by the spacing of successive teeth thereon, with each downward movement of the arm 660. Retrograde movement of the ratchet bar is prevented by a pawl 686 which is mounted to slide upon the frame 380 into and out of engagement with the ratchet bar and is biased toward the ratchet bar by a spring 688, the latter being stretched between the frame 380 and an arm 690 which is pivoted at its upper end to the pawl 686 and is fixed upon a shaft 692 rotatably mounted in the frame 380. This pawl holds the ratchet bar in the position to which it is lowered at the end of each driving stroke of the pawl 664.

Figure 16:
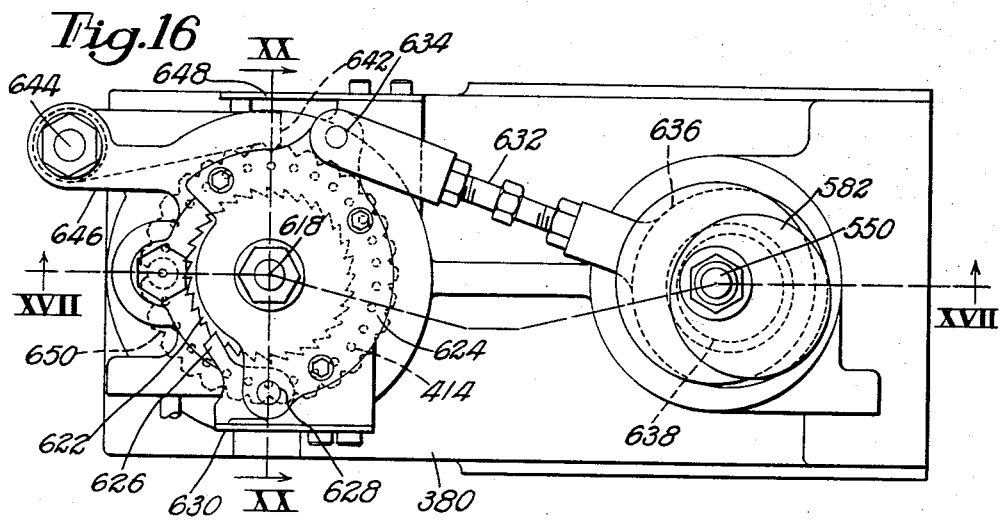
Fig. 16 is a plan view of the fastener forming device with the fastener feeding structure removed therefrom.

Thus, the ratchet bar 670 is lowered, step by step, into engagement with the above-mentioned latch 542 (Fig. 15) which is depressed by the bar out of the notch 541 in the trip rod 516, permitting the latter to slide, under the impulse of the spring 520, into engagement with the clutch 518. When the upper level of the cam surface on the clutch 518 first comes opposite to the trip rod, the rod moves beneath the clutch and, as the cam surface is presented to the rod, the pin 546 is withdrawn from the pulley 552. Immediately thereafter, upon the engagement of the pin with the trip rod, the rotation of the shaft 550 is terminated. The shear block 416 (Figs. 16 and 17) is now held in the position in which it is located by the pawl 642 at the end of the last completed revolution of the drive shaft 550, and an open hole 414 in the block will have been brought into register with the tube 580, in readiness to receive the first fastener of the next group to be made.

It will now be evident that the number of fasteners formed by each cycle of operation of the fastener forming device 108 is equal to the number of the movements made by the ratchet bar 670 (Figs. 18 and 19) between its initial position and the releasing of the trip rod 516 by the latch 542, at the lower end of the stroke of the ratchet bar. Consequently, any predetermined number of fastenings can be produced during each cycle of operation of the device 108, according to the initial position of the ratchet bar, as determined by the setting of either the stop 674 or the stop 412, when the cycle begins. If (for example, a distributor 374 requiring eleven fasteners, as shown in Fig. 22, is assembled in the machine, the stop screw 412 will be so adjusted in the distributor as to cause the ratchet bar 670 to be held in an initial position at a distance above the latch 542 equal to the aggregate spacing of eleven teeth on the ratchet bar. Thus, in any cycle of operation of the device 108, it may make, according to the setting of the screw or the stop 674, from one up to the number of fasteners corresponding to the maximum possible travel of the ratchet bar.

Upon movement of the trip rod 516 into engagement with the clutch 518, a cam lug 694 (Fig. 15), fixed upon the trip rod 516, engages an arm 696 (Figs. 19 and 15) which projects through the table 14 and is fixed upon the above-mentioned shaft 692, whereby the pawl 686 is retracted from the ratchet bar and the latter is elevated into its initial position by the spring 672. The pawl 664 is disengaged from the ratchet bar, at this time, by the engagement of the tail of the pawl with the stop 684. With the return movement of the trip rod 516 into engagement with the clutch 518, the arm 530 is swung idly about its pivotal connection with the link 534 and is returned into juxtaposition to the arm 524 at 532, in readiness for the next retraction of the trip rod from the clutch.

With the last downward movement of the ratchet bar 670, and just before the disengagement of the latch 542 from the trip rod 516, a shoulder 698 (Fig. 19), at the rear side of the ratchet bar, engages and depresses the forward end of the above-mentioned arm 513, which is fixed to the shaft 512 and extends forwardly of the machine into the slideway 668 and the path of the shoulder 698. In response to depression of the arm 513 by the ratchet bar, the latch 509 is lifted to disengage the shoulder 504 thereon from the lug 506, whereupon the latch 428 rises, under the impulse of the spring 454, until its top end seats against the bottom of the lug 427 on the loader arm 348.

Although all events in the operation of the machine at the conclusion of an operating cycle have now been described, it is desirable to describe, at this time, the resetting of the shoulder 430 of the latch 428 against the lower side of the lip 432, which occurs at the very beginning of each operating cycle.

In response to the closure of the switch 78 and either one of the switches 100, 102, upon the presentation of a shoe to the machine, there is energized a solenoid 700 (Fig. 18) the armature of which is attached to the lower end of the above-mentioned latch 468 and now retracts it from the buffer plunger 458. When thus released, the buffer plunger, driven by the spring 462, imparts a preliminary movement to the loader arm 348 out of its fastener receiving position which is limited by the engagement of the nut 466 on the plunger with the screw 464. During the first portion of this movement of the loader arm, the side of the latch 428 above the shoulder 430 is brought into engagement with the lip 432 and, with further movement of the loader arm, the lug 427 on it is moved off the top of the latch, whereby the latch is permitted to rise until its shoulder 430 is reset against the lower side of the lip 432. The latch 428 is thus returned into the position it occupies when it is tripped, as above described, at the end of the return movement of the loader arm into its fastener receiving position. The last-mentioned rising movement of the latch 428, by which its shoulder 430 is seated upon the lip 432, causes the upper end of the latch to be positioned above the lower side of the lug 427. Accordingly, when the latch is tripped by the loader arm, upward movement of the latch is unimpeded.

During the above-mentioned preliminary movement of the loader arm 348, a cam 702 (Fig. 3), fixed upon the shaft 344 immediately below the table 14, operates and closes a normally open microswitch 704 which is series connected in the circuit through which the solenoid 132 (Fig. 6), for initiating a revolution of the main drive shaft 114, is energized. Provision is thus made for preventing a cycle of operation of the pricking and driving mechanism as well as the loader arm from being started, should the latter be prevented from responding to the action of the buffer plunger 458, as by fasteners incompletely delivered from the distributor 374 into the loader block 106, or for any other reason.

The principal aspects of the mode of operation and use of the machine will now be briefly summarized. A lasted shoe, the heel seat of which is to be fastened, is presented to the machine upon the work support 10 with the heel end of the shoe inserted between the rolls 52, 52 of the heel centering device 46 and is moved rearwardly until it is stopped upon the engagement of the arms 48, 50 with the pins 76. The heel of the shoe is now positioned laterally and rearwardly thereof over the work support 10, according to the adjustments of the device 46 which will have already been made. The toe end of the shoe is then swung laterally, toward the inside of the shoe, against one of the arms 82, 84, depending upon whether the shoe is a right shoe or a left shoe, respectively. These arms will have been adjusted, by means of the adjusting screw 86, so that when the heel seat of the shoe is oriented properly upon the work support, that one of the microswitches 100, 102 which is operated by the arm engaged by the shoe is closed.

With the closure of the microswitch 78 and either one of the microswitches 100, 102, there is closed the circuit which includes both the solenoid for retracting the latch 202, whereby the holddown 40 is caused to apply a preliminary clamping pressure to the work under the impulse of the spring 188, and a second solenoid 700 for releasing the buffer plunger 458. The latter imparts the above-mentioned preliminary movement to the loader arm 348 which causes a preparatory closing, by the switch 704, of the circuit including the solenoid 132 for initiating a revolution of the main drive shaft 114. Subject to a short time delay effected by a relay, during which the above-mentioned action of the plunger 458 occurs, the circuit including the solenoid 132 is next closed, also in response to the operation of the microswitch 78 and one of the switches 100, 102, whereby there is initiated a complete revolution of the drive shaft 114.

With the application of the preliminary clamping pressure to the work, it is held upon the work support in the proper position to receive fasteners in the heel seat. Rotation of the shaft 114 throughout one revolution causes the driver unit 104 to be reciprocated up and down twice, first through pricking and pricking return strokes and then through driving and driving return strokes, the end of a complete revolution of the shaft being under the control of the cam 232 on the shaft. During the pricking stroke the spring 244, for providing final clamping pressure, is rapidly compressed in response to rising movement to the carrier 144, and this spring pressure is delivered to the holddown through the lever 254, pawl 260 and ratchet 264. With further upward movement of the carrier 144 and the engagement of the drivers with the work, upward force of the drivers upon the work tends to overcome the pressure of the holddown 40 applied to the work. However, the work is held against the work support, regardless of the amount of pricking pressure, by the latch 268 and ratchet 272 which cooperate to prevent retrograde movement of the lever 254.

When the drivers will have nearly penetrated the work to the bottom plate on the last, sufficient resistance is presented by the work to the drivers to cause the fluid in the cylinder 292 to be vented therefrom via the valve element 304, which permits the carrier 144 to rise without a corresponding upward movement of the drivers, whereby the pressure between the drivers and work is relieved. Within a very short time after this movement of the carrier 144 relatively to the drivers begins, the cylinder 292 is further vented via the piston 314, insuring relief of the fluid pressure in the cylinder 292 quickly and completely enough to prevent damage to the drivers.

Throughout the pricking stroke, pressure is continuously being built up in the spring 244 and, at the beginning of the pricking return stroke, with any retraction of the carrier 144, upward pressure of the drivers upon the shoe is eliminated except for the minor amount of pressure exerted by the spring 150, by which the driver unit 104 is biased upwardly within the carrier. Consequently, the full effect of the spring 244, when subject to its maximum compression, is now imparted to the holddown and, at this time, the pawl 268 may rise and become engaged with the ratchet 272 one tooth higher than before. The holddown 40 is thus held, subject to the final clamping pressure, throughout the pricking return stroke, the driving stroke and most of the driving return stroke.

During the pricking return stroke, the cam 324 causes the loader block 106, which will already have been supplied with a load of fasteners during the previous cycle of the machine, to be moved into register with the drivers as soon as they will have been lowered out of the path of the loader block, register of the loader block with the driver unit being obtained by the engagement of the loader block with the screw 362.

The driving stroke of the driver unit now takes place, in which the fasteners are carried upwardly out of the loader block and are driven into the pricked holes in the work without the occurrence of any yielding action between the driver unit and the carrier 144. When the drivers, during the driving return stroke, will have been lowered out of the loader block 106 (within 5–10 degrees from the end of the revolution of the shaft 114), the drop 366 on the cam 324 permits the sudden return of the loader block into the fastener receiving position.

When the loader block closely approaches this position, the latch 428 is tripped by the lug 427 on the loader arm 348 which causes, nearly simultaneously, the locking of the loader arm by the pin 360 in register with the distributor 374, the release of the shutter 372, and the initiation of a cycle of operation of the fastener forming device 108. The buffer plunger 458 is also moved into its retracted position in which it is held by the latch 468.

The shutter 372, upon being released by the rod 424, is immediately moved forward to release, for movement into the distributor, the group of fasteners which were made and retained in the shear block 416 during the previous cycle of operation of the device 108. Upon the release of the fasteners by the shutter, the valve 498 is opened by the screw 497 on the lever 480 and a blast of air is imparted to the fasteners to drive them through the distributor 374 into the loader block 106.

Simultaneously with the above described operation of the shutter, the drive for the fastener forming device 108 is established by the retraction of the trip rod 516 from the clutch 518, whereupon rotation of the drive shaft 550 begins. The trip rod 516 is held, by the latch 542, away from the clutch 518 for a predetermined period required for the formation of the desired number of fasteners and then is automatically released, by the counting mechanism, to disengage the clutch 518 and stop the operation of the device 108.

During the first rotation of the drive shaft 550, the cam 572 thereon causes the resetting of the latch 428 with its top end below the bottom surface of the lug 427 on the loader arm 348. The shutter 372 is also returned to its closed position and locked therein by the rod 424.

With each rotation of the drive shaft 550 a length of fastener material 564 is advanced into the hole 414 of the shear block 416 beneath the tube 580 and, thereafter, the shear block is rotated through the angle between successive holes therein to form a fastener and to present another empty hole to the tube for the reception of the fastener next to be made. With the formation of each fastener, the ratchet bar 670 will be lowered a distance equal to that between successive teeth on the bar, until the lower end of the bar disengages the latch 542 from the trip rod 516, whereupon the operation of the device 108 is immediately stopped. The device will therefore form, in one cycle of its operation, a fastener for every step of movement of the ratchet bar, the number of steps being determined by the initial position of the ratchet bar which is under the control of either the stop 674 or the stop 412 on the distributor 374.

At the completion of the downward movement of the ratchet bar 670, its shoulder 698 depresses the arm 513, causing the latch 500 to be disengaged from the lug 506, whereupon the latch 428 is permitted to rise until its bottom end seats against the bottom of the lug 427 on the loader arm 348.

In response to the return movement of the trip rod 516 into re-engagement with the clutch 518, the cam lug 694 on the rod swings the arm 696 upwardly and causes the retraction of the pawl 686 from the ratchet bar 670. This bar is now returned to its initial position by the spring 672, whereupon the machine is restored to the state that existed when its operating cycle was started.

The termination of the cycle of operation of the fastener forming device 108 may occur before or after the end of the revolution of the shaft 114, depending upon whether a very few or many fasteners are to be made.

Having thus described my invention what I claim as new and desire to secure by Letters Patent of the United States is:

1. In a shoemaking machine having a support for a shoe against which a tool is pressed to perform an operation upon the shoe, tool operating mechanism for moving said tool into and out of engagement with the shoe, said mechanism comprising a driving member and a driven member, yieldable force transmitting means disposed between said members permitting relative movement between said members in response to pressure between said tool and the shoe in excess of a predetermined amount, and means controlled by said members in response to their relative movement for relieving the force transmitted to the driven member by said force transmitting means.

2. In a shoemaking machine having a support for a shoe against which a tool is pressed to perform an operation upon the shoe, tool operating mechanism for moving said tool into and out of engagement with the shoe, said mechanism comprising relatively yieldable driving and driven members, yieldable force transmitting means disposed between said members permitting movement of said driving member relatively to said driven member in response to pressure between the tool and the shoe in excess of a predetermined amount, and means associated with both of said members and controlled by movement of said driving member with respect to said driven member for relieving the force transmitted to the driven member by said force transmitting means.

3. In a shoemaking machine having a support for a shoe against which a tool is pressed to perform an operation upon the shoe, tool operating mechanism for moving said tool into and out of engagement with the shoe, said mechanism comprising a driving member operable through a predetermined stroke, a driven member associated with said tool, yieldable force transmitting means disposed between said members permitting lost motion of said driving member with respect to said driven member when a predetermined pressure between said tool and shoe has been attained, and means operated by said members in response to any of said lost motion for immediately relieving the force transmitted to said driven member by said force transmitting means.

4. In a fastening inserting machine having a support for a workpiece into which fastenings are to be driven by a driver movable toward and away from the workpiece, tool operating mechanism comprising telescoping driving and driven members movable through alternate operating and return strokes, said members defining a chamber for holding a fluid, means for venting fluid from said chamber during the operating stroke of said driver in response to fluid pressure exceeding a predetermined amount whereby relative movement occurs between said members, and means operated by said members in response to said relative movement for further venting fluid from said chamber.

5. In a fastening inserting machine having a support for a workpiece into which fasteners are to be driven by a driver movable through alternate operating and return strokes toward and away from the workpiece, driver operating mechanism comprising telescoping driving and driven members which enclose a chamber for holding a fluid, means operable in response to fluid pressure exceeding a predetermined amount for venting said chamber during the operating stroke of said driver whereby lost motion occurs between said members, and means connecting said members for further venting said chamber at the beginning of said lost motion.

6. In a shoemaking machine having a support for a workpiece into which fastenings are to be driven by a driver which is movable into and out of engagement with the workpiece, driver operating mechanism comprising driving and driven members which are movable relatively to each other and form a chamber for holding a fluid, said mechanism being operable to impart alternate operating and return strokes to said driver whereby it is carried into and out of engagement with the workpiece, means associated with said driven member for venting fluid from said chamber in response to a predetermined pressure in the fluid whereby yielding movement of said driving member occurs, and means cooperating with said first-mentioned means and operated in response to said yielding movement of said driving member for further venting said chamber.

7. In a shoemaking machine having a support for a workpiece against which a tool is pressed to perform an operation upon a workpiece, tool operating mechanism for moving said tool into and out of engagement with the workpiece with alternate operating and return strokes respectively, said mechanism comprising relatively yieldable driven and driving members enclosing a body of fluid, and means for venting said fluid comprising a pressure relief valve operable in response to a predetermined pressure whereby lost motion occurs between said driving member and said driven member, and a second valve which is connected to and opened by said members upon the occurrence of said lost motion.

8. In a fastening inserting machine having a support for a workpiece into which fastenings are driven by a driver movable toward and away from the workpiece, tool operating mechanism comprising driving and driven members movable through alternate operating and return strokes, said members also being mounted for movement relatively to each other in telescopic relation to enclose a chamber for holding a body of fluid between them, and means for venting said chamber during the operating stroke comprising elements one of which is associated with each of said driving and driven members, one of said elements being operable to vent said chamber in response to a predetermined fluid pressure therein whereby relatively yielding movement of said members occurs, said elements also being operated by said members in response to said relative yielding movement further to vent said chamber.

9. In a fastener inserting machine having a fastener forming device operable to form from a strand of fastener material one fastener per cycle of operation of said device, said device comprising a clutch for starting and stopping its operation, a distributor for receiving and delivering a certain number of fasteners from said device and having a stop surface thereon, counting means for disengaging said clutch when any predetermined number of fasteners have been made, and means cooperating with said stop surface for setting said counting means according to the number of fasteners to be supplied to said distributor.

10. In a fastener inserting machine having a fastener forming device operable to form from a strand of fastener material one fastener per cycle of operation of said device, said device comprising a clutch for starting and stopping its operation, said device also being adapted to hold in register therewith a distributor of variable capacity for receiving and delivering different numbers of fasteners from said device, said distributor having a stop which is adjustable thereon into different positions corresponding to said different numbers of fasteners, counting means for disengaging said clutch when a predetermined number of fasteners have been made, and means cooperating with said stop for setting said counting means according to the distributor's fastener capacity.

11. In a fastener inserting machine having a fastener forming device operable to form from a strand of fastener material one fastener per cycle of operation of said device, said device comprising a clutch for starting and stopping its operation, a distributor for receiving and delivering a variable number of fasteners from said device and having a stop mounted thereon for adjustment into different positions according to the size of said number, counting means comprising a counting member which is moved in synchronism with said device from a variable starting position to disengage said clutch whereby the operation of said device is stopped when a predetermined number of fasteners have been made, and means cooperating with said stop for determining the starting position of said counting member according to the fastener capacity of said distributor.

12. In a fastener inserting machine having a fastener forming device operable to form from a strand of fastener material one fastener per cycle of operation of said device, said device comprising a clutch for starting and stopping its operation, a distributor for receiving and delivering from said device a plurality of fasteners, said distributor having a stop thereon in a position related to the distributor's fastener capacity, counting means comprising a trip member normally biased into operative engagement with said clutch whereby it is disengaged, a latch for holding said trip member away from said clutch whereby engagement of said clutch is permitted, a counter member movable into and out of engagement with said latch and being biased away from said latch, means for moving said counter member intermittently once for each cycle of operation of said device toward said latch, a pawl cooperating with said counter member to prevent retrograde movement thereof, means operated by said trip member upon its release by said latch for disengaging said pawl from said counter member, and means cooperating with said stop for limiting the retrograde movement of said counter member according to the fastener capacity of said distributor.

13. A fastener inserting machine having a work support, a holddown for holding a work piece upon said support, driver mechanism operable through successive pricking and driving strokes in each cycle of its operation to prick the work piece and drive fasteners therein, and holddown operating mechanism comprising a spring-loaded member, a stop carried by said driver mechanism for holding said member in its loaded state, means for both retracting said stop from said member and initiating a cycle of operation of said driver mechanism whereby preliminary pressure is applied to said holddown upon the release of said member and as the pricking stroke begins, connections operated by said driver mechanism for applying increased pressure to said holddown during the pricking stroke, and latch means for holding said holddown in the position to which it is brought at the end of the pricking stroke, said stop being operated by said driver mechanism following the pricking stroke to return said spring-loaded member into its loaded state.

14. A fastener inserting machine having a work support, a holddown for holding a work piece upon said support, driver mechanism operable through successive pricking and driving strokes in each cycle of its operation to prick the work piece and drive fasteners therein, and holddown operating mechanism comprising a spring-loaded member, a stop carried by said driver mechanism for holding said member in its loaded state, means for both retracting said stop from said member and initiating a cycle of operation of said driver mechanism whereby preliminary pressure is applied to said holddown at the beginning of the pricking stroke, connections operated by said driver mechanism during the pricking stroke for applying an increased pressure to said holddown, latch means for locking said holddown against retractive movement in the position to which it is brought at the end of the pricking stroke, and means for disengaging said latch means after the driving stroke of said driver mechanism occurs whereby said holddown is released from the work piece.

15. A fastener inserting machine having a work support, a holddown for holding a work piece upon said support, driver mechanism operable through successive pricking and driving strokes in each cycle of its operation to prick the work piece and drive fasteners therein, and holddown operating mechanism comprising a spring-loaded member, a stop biased upon said driver mechanism into engagement with said member to hold it in its loaded state, means for both retracting said stop and initiating a cycle of operation of said driver mechanism to cause preliminary pressure to be applied to said holddown as the pricking stroke begins, yielding connections operated by said driver mechanism for increasing throughout the pricking stroke the pressure applied to said holddown, latch means for locking said holddown against retractive movement in the position to which it is brought at the end of the pricking stroke, said stop being operated by said driver mechanism after the pricking stroke to return said spring-loaded member to its loaded state, and means for disengaging said latch means after the driving stroke of said driver mechanism occurs whereby said holddown is released from the work piece.

References Cited in the file of this patent

UNITED STATES PATENTS

| | | |
|---|---|---|
| 207,049 | MacColl | Aug. 13, 1878 |
| 543,154 | Kuhlewind | July 23, 1895 |
| 1,808,606 | Pets | June 2, 1931 |
| 2,078,317 | Eastman | Apr. 27, 1937 |
| 2,225,142 | Winkley | Dec. 17, 1940 |
| 2,315,548 | Schoenky | Apr. 6, 1943 |
| 2,438,951 | Stephens | Apr. 6, 1948 |
| 2,509,870 | Larsson | May 30, 1950 |
| 2,690,560 | Willmott | Oct. 5, 1954 |

UNITED STATES PATENT OFFICE
CERTIFICATE OF CORRECTION

Patent No. 2,956,284  
October 18, 1960

Basil A. Strout

It is hereby certified that error appears in the above numbered patent requiring correction and that the said Letters Patent should read as corrected below.

Column 21, line 13, after "predetermined" insert -- fluid --.

Signed and sealed this 3rd day of April 1962.

(SEAL)  
Attest:

ERNEST W. SWIDER  
Attesting Officer

DAVID L. LADD  
Commissioner of Patents